(12) United States Patent
Bai

(10) Patent No.: US 12,291,685 B2
(45) Date of Patent: *May 6, 2025

(54) PROCESS FOR PRODUCING SOLID BIOMASS FUEL

(71) Applicant: Hong Mei Bai, Hong Kong (CN)

(72) Inventor: Hong Mei Bai, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/268,200

(22) PCT Filed: Feb. 5, 2021

(86) PCT No.: PCT/GB2021/050260
§ 371 (c)(1),
(2) Date: Feb. 12, 2021

(87) PCT Pub. No.: WO2021/156628
PCT Pub. Date: Aug. 12, 2021

(65) Prior Publication Data
US 2022/0306958 A1    Sep. 29, 2022

(30) Foreign Application Priority Data

Feb. 6, 2020    (GB) ...................................... 2001650

(51) Int. Cl.
*C10L 5/44*    (2006.01)
*C10L 5/08*    (2006.01)
(Continued)

(52) U.S. Cl.
CPC ................. *C10L 5/445* (2013.01); *C10L 5/08* (2013.01); *C10L 5/24* (2013.01); *C10L 5/28* (2013.01);
(Continued)

(58) Field of Classification Search
CPC .... C10L 5/366; C10L 5/44; C10L 5/28; C10L 5/24; C10L 5/445; C10L 5/08;
(Continued)

(56) References Cited

U.S. PATENT DOCUMENTS

| 2013/0247456 A1* | 9/2013 | Dale ..................... C08L 97/005 44/535 |
| 2019/0112530 A1 | 4/2019 | Hayashi et al. |
| 2019/0119593 A1* | 4/2019 | Hayashi .................. C10L 5/445 |

FOREIGN PATENT DOCUMENTS

| CN | 104593112 A | 5/2015 |
| CN | 204455043 U | 7/2015 |

(Continued)

OTHER PUBLICATIONS

Invitation to Pay Additional Fees and, Where Applicable, Protest Fee with Annex to Form PCT/ISA/206, Communication Relating to the Results of the Partial International Search dated Apr. 13, 2021 for PCT/GB2021/050260.

(Continued)

*Primary Examiner* — Vishal V Vasisth
(74) *Attorney, Agent, or Firm* — Ryan T. Grace; Advent, LLP

(57) ABSTRACT

The present invention relates to a process for producing a solid biomass fuel, as well as a solid biomass fuel produced by said process. Additionally, the present invention relates to a combustion process comprising combusting said solid biomass fuel so as to produce energy.

17 Claims, 23 Drawing Sheets

(51) Int. Cl.
*C10L 5/24* (2006.01)
*C10L 5/28* (2006.01)
*C10L 5/36* (2006.01)

(52) U.S. Cl.
CPC ....... *C10L 5/366* (2013.01); *C10L 2200/0469* (2013.01); *C10L 2250/06* (2013.01); *C10L 2290/06* (2013.01); *C10L 2290/08* (2013.01); *C10L 2290/24* (2013.01); *C10L 2290/28* (2013.01); *C10L 2290/30* (2013.01); *C10L 2290/32* (2013.01); *C10L 2290/546* (2013.01)

(58) Field of Classification Search
CPC ............. C10L 2290/52; C10L 2290/24; C10L 2290/30; C10L 2290/06; C10L 2290/546; C10L 2250/06; C10L 2290/28; C10L 2290/565; C10L 2290/08; C10L 2290/32; C10L 2200/0469
See application file for complete search history.

(56) References Cited

FOREIGN PATENT DOCUMENTS

| | | | |
|---|---|---|---|
| CN | 105623773 | A | 6/2016 |
| CN | 107603686 | A | 1/2018 |
| CN | 107779235 | A | 3/2018 |
| CN | 108300520 | B | 7/2018 |
| CN | 109207229 | A | 1/2019 |
| CN | 109370674 | A | 2/2019 |
| CN | 109370679 | A | 2/2019 |
| CN | 109370695 | A | 2/2019 |
| CN | 109385320 | A | 2/2019 |
| CN | 109456812 | A | 3/2019 |
| CN | 110205176 | A | 9/2019 |
| CN | 110205716 | A | 9/2019 |
| CN | 110240965 | A | 9/2019 |
| CN | 110699140 | A | 1/2020 |
| EP | 4010452 | A1 | 6/2022 |
| GB | 2586230 | A | 2/2021 |
| GB | 2596951 | A | 1/2022 |
| GB | 2596952 | A | 1/2022 |
| WO | 2021024001 | A1 | 2/2021 |

OTHER PUBLICATIONS

Database WPI Week 201825, Thomson Scientific, London, GB; An 2018-21449Y XP002802544.
Database WPI Week 201925, Thomson Scientific, London, GB; An 2019-203818 XP002802543.
Database WPI Week 201985, Thomson Scientific, London, GB; An 2019-915682 XP002802546.
Database WPI Week 2020009 Thomson Scientific, London, GB; An 2020-086335 XP002802545.
UK Search Report for GB2001650.7 dated Jul. 10, 2020.
Examination Report in United Kingdom for Patent Application No. GB2001650.7, dated Jan. 26, 2024.
Examination Report in United Kingdom for patent application No. GB2001650.7, dated Jun. 17, 2024.

* cited by examiner

PROCESS FOR PRODUCING SOLID BIOMASS FUEL

This application is a 371 of PCT/GB2021/050260, filed Feb. 5, 2021.

FIELD OF THE INVENTION

The present invention relates to a process for producing a solid biomass fuel, as well as a solid biomass fuel produced by said process. Additionally, the present invention relates to a combustion process comprising combusting said solid biomass fuel so as to produce energy.

BACKGROUND OF THE INVENTION

Coal-fired power generation is used in power plants and industrial processes around the world. Coal and other fossil fuels are non-renewable energy resources. Over the last few decades, there have been calls to reduce the consumption of coal in coal-fired power stations and instead to use renewable resources for energy.

Fuels derived from biomass are an example of a renewable energy source that can be used to replace or at least partially replace coal. Biomass derived fuels can be burned in the presence of oxygen in power plants in combustion processes to produce energy. Biomass derived fuels can be combusted in traditional power plants originally designed for coal combustion, or biomass derived fuels can be combusted in power plants built specifically for biomass combustion. Certain forms of biomass can be mixed with coal and combusted in the same combustion process within a power plant. Such a process is known as coal co-firing of biomass. To be suitable for co-firing with coal, biomass derived fuel must typically have certain properties such as a certain level of quality and homogeneity with regard to properties. For example, biomass fuel comprised of particles of a homogenous size, density, moisture content etc. are particularly desirable in co-firing processes. It is also desirable that the biomass fuel contains a low level of ash. Levels of ash in biomass derived fuels are typically higher than those found in coal.

Various processes for producing solid biomass fuels from biomass sources are known. WO2014/087949 discloses a process for producing a solid biomass fuel in which a source of biomass is steam exploded before being molded into biomass blocks which are then heated so as to form the biomass fuel. The aim of the process is to produce biomass fuel with sufficient handleability during storage and with reduced chemical oxygen demand (COD) in discharged water during storage. The biomass source used in the process is palm kernel shell.

WO2016/056608 builds upon the teaching of WO2014/087949, and discloses a process for manufacturing solid biomass fuel in which the steam explosion step is not required to produce the fuel. The process comprises a molding step in which a biomass source is crushed before being compressed and molded into biomass blocks, before the biomass blocks are heated. The biomass source taught for use in said process is trees such as douglas fir, hemlock, cedar, cypress, European red pine, almond old tree, almond shell, acacia xylem part, acacia bark, walnut shell, sago palm, empty fruit bunches, meranti and rubber.

WO2017/175733 discloses a similar process comprising a molding step in which a biomass source is crushed before being compressed and molded into biomass blocks, before the biomass blocks are heated. The process of WO2017/175733 is directed to providing biomass fuel which exhibits low disintegration and achieves reduced COD in discharged water when exposed to rain water. The source of the biomass to be used in the process is selected from the rubber tree, acacia, meranti, eucalyptus, teak and a mixture of larch, spruce and birch.

WO2019/069849 aims to provide a biomass fuel that is easy to transport and store and that is resistant to spontaneous combustion during storage. The biomass fuel is made by a process comprising a molding step in which a biomass source is crushed before being compressed and molded into biomass blocks, before the biomass blocks are heated. The biomass source for producing the fuel is selected from rubber trees, acacia trees, radiata pine, a mixture of larch, spruce and birch; and spruce, pine and fir.

WO2019/069860 discloses an apparatus for producing biomass solid fuel. The apparatus comprises a carbonisation furnace for carbonising a molded biomass product to obtain a biomass solid fuel. The apparatus further comprises a yield calculation unit, a temperature measurement unit and a control unit. The control unit controls the heat applied to the carbonisation furnace based upon the spontaneous combustion properties of the biomass fuel. The molded biomass product is formed by pulverising a biomass source into pellets, before molding said pellets into a molded biomass product. The biomass source is selected from the rubber tree, acacia, dipterocarp, radia pine, a mixture of larch, spruce and birch or a mixture of spruce, pine and firs.

WO2018/181919 discloses a different process to those discussed above for producing a solid biomass fuel. The process involves a step of hydrothermal carbonisation of biomass in which a biomass source is pressurised in hot water so as to carbonise the biomass. The process is reported to provide a biomass fuel with high grindability in high yield and with reduced manufacturing costs. The source of the biomass is selected from husks, palm kernel shell, coconut palm, bamboo, empty fruit bunches, apricots and aubergines.

WO2017/175737 discloses a cooling apparatus for cooling carbonised biomass. The apparatus improves the cooling efficiency of semi-carbonised molded biomass. The apparatus cools the biomass by spraying water thereon. The cooler comprises a vibration flat plate and a spraying section for spraying water on the flat plate. The biomass fuel is produced by the same processes as discussed above. The source of biomass for producing the biomass fuel is douglas fir, hemlock, cedar, cypress, European red pine, almond old tree, almond shell, acacia xylem part, acacia bark, walnut shell, sago palm, empty fruit bunches, meranti and the rubber tree.

Finally, WO2014/050964 discloses a process for improving the grindability of biomass such that it can be ground with coal. The process involves increasing the moisture content of ground wood biomass to between 10 to 50%; densifying the biomass to have a density of 0.55 g/cm$^3$ or higher, before subjecting the biomass to torrefaction. The source of biomass includes wood chips, bark, wood shavings, and sawdust.

The inventors of the present invention have appreciated that the solid biomass fuels and processes for their production discussed in the above documents have various problems associated with them. For example, the biomass sources described in the above documents are all plants and trees that typically only occur naturally, and that are not easy to cultivate and harvest on a commercial scale. The inventors have appreciated that it would be advantageous to have a source of biomass that can be grown and harvested easily or that is available on a commercial scale. It would also be advantageous to have a source of biomass that can be grown and harvested such that the quality and specific characteristics of the biomass source can be controlled. It would also be advantageous to have an alternative biomass source that does not require extensive deforestation in order to provide sufficient amounts of the biomass source for use as fuel.

Additionally, it has been found by the inventors that the sources of biomass described in the above documents, all being comprised of wood and similar materials, when subjected to conventional pulverising techniques known in the art, form particles with a low degree of homogeneity. Furthermore, pulverising the biomass sources is expensive due to the nature of the wood and wood-like material being difficult to pulverise. The inventors of the present invention have appreciated that it would be advantageous to have a source of biomass that is more easily pulverised by conventional pulverising techniques known in the art, and that forms more homogenous sized particles when pulverised.

Additionally, it has been found by the inventors that solid biomass fuels prepared from the biomass sources discussed in the above documents and prepared by the processes in the above documents do not have sufficient water proof characteristics. Water proof characteristics are important for solid biomass fuels since they need to be dry (or at least sufficiently dry) when used in a combustion process (either on their own or when co-fired with coal). Biomass fuels are frequently exposed to moisture during storage or transportation (such as from rain water). Accordingly, biomass fuels with increased water proof capacity are desirable.

The present inventors have also appreciated that the biomass fuel production processes described in the above documents do not provide fuels with sufficient quality and uniformity. In particular, the processes discussed above do not provide sufficient control of the density of the biomass during the molding step.

SUMMARY OF THE INVENTION

The present invention addresses the problems discussed above associated with prior processes. It has been surprisingly found by the inventors of the present invention that certain sources of biomass that are useful in providing solid biomass fuels, can be grown and harvested on a commercial scale. In doing so, a fixed and constant source of biomass for the production of fuels can be provided in growth cycles. Additionally, growing and harvesting said sources of biomass on a commercial scale enables control of the quality and uniformity of the biomass source, for example by cultivation and breeding techniques.

Additionally, it has also been found by the inventors of the present invention that certain sources of biomass that are agricultural waste products can be used to produce solid biomass fuels.

In addition to the above, the inventors of the present invention have also found that biomass fuels with improved waterproof characteristics can be provided by modifying the pulverizing, molding and/or heating steps of the process. The adaptation and control of the pulverizing, molding and heating steps of the process of the invention has also been found to improve the quality and uniformity of the solid biomass fuel product, as well as impart certain physical characteristics to it that are highly preferable for use in a combustion process. Furthermore, the adaptation of the molding and heating steps has been found to increase the yield of the solid biomass fuel, and impart characteristics to the fuel that make it easier to transport and store. The inventors have found that the nature of the biomass source, and the specific features of the pulverization, molding and heating step act together to provide a superior biomass fuel product for use in combustion processes over those known in the art.

According to a first aspect of the invention, there is provided a process for producing a solid biomass fuel, wherein the process comprises the following steps:
(i) providing one or more sources of biomass with an average particle diameter (D50) of from 30,000 μm to 60,000 μm;
(ii) pulverising the one or more sources of biomass to provide a pulverised biomass powder with an average particle diameter (D50) of from 1000 μm to 10,000 μm;
(iii) drying the pulverised biomass powder so as to provide a dried pulverised biomass powder;
(iv) molding the dried pulverised biomass powder so as to provide a molded biomass product;
(v) heating the molded biomass product to a temperature of from 160° C. to 420° C. for a time period of from 0.25 to 5 hours so as to provide a solid biomass fuel; and
(vi) removing dust particles from the solid biomass fuel.
wherein the one or more sources of biomass comprise bagasse, sunflower stalks, wheat stalks, corn stalks, sorghum stalks, soybean stalk, peanut stalks, cotton stalks, rape stalks, coconut husks, palm husks, seaweed, peanut hulls, or a combination thereof.

Preferably, the one or more sources of biomass consist essentially of, or consist of: bagasse, sunflower stalks, wheat stalks, corn stalks, sorghum stalks, soybean stalks, peanut stalks, cotton stalks, rape stalks, coconut husks, palm husks, seaweed, peanut hulls, or a combination thereof.

Typically, step (i) of providing one or more sources of biomass with an average particle diameter (D50) of from 30,000 μm to 60,000 μm comprises chopping the one or more sources of biomass so as to have an average particle diameter (D50) of from 30,000 μm to 60,000 μm.

In an embodiment, step (ii) of pulverising the one or more sources of biomass to provide a pulverised biomass powder with an average particle diameter (D50) of from 1000 μm to 10,000 μm comprises (a) crushing the one or more sources of biomass in a process involving the use of a negative pressure pneumatic conveyancing apparatus where the moisture content of the one or more sources of biomass is 20% by weight or less.

Typically, step (iii) of drying the pulverised biomass powder so as to provide a dried pulverised biomass powder comprises drying the pulverised biomass in a drying cylinder.

In some embodiments, the moisture content of the pulverised biomass powder is 20% by weight or more, and the process comprises drying the pulverised biomass in multiple drying cylinders.

In some embodiments, step (iii) of drying the pulverised biomass powder so as to provide a dried pulverised biomass powder further comprises mixing the pulverised biomass powder particles whilst drying.

Typically, step (iv) of molding the dried pulverised biomass powder comprises adapting the molding step such that the density of the molded biomass product is controlled, optionally wherein adapting the molding step such that the density of the molded biomass product is controlled comprises controlling the compression ratio of a mold used in said molding step.

Typically, an additive is added to the dried pulverised biomass powder prior to step (iv) of molding the dried compressed biomass powder. Preferably, the additive increases the yield of the molded biomass product.

Typically, step (v) of heating the molded biomass product is carried out for a time period of from 0.4 to 2.5 hours, and/or wherein the step of heating the molded biomass product comprises heating the molded biomass product to a temperature of from 180° C. to 350° C., optionally from 210° C. to 280° C. Preferably, step (v) of heating the molded biomass product comprises heating the molded biomass product under conditions so as to induce torrefaction of the molded biomass product.

Typically, step (v) of heating the molded biomass product is adapted so as to control the uniformity of the solid biomass fuel, optionally wherein adapting step (v) so as to control the uniformity of the solid biomass fuel comprises conducting step (v) in an apparatus in which the molded biomass product is rotated whilst being heated, optionally, wherein adapting step (v) so as to control the uniformity of the solid biomass fuel comprises controlling the speed or direction of rotation of the molded biomass product, optionally wherein the molded biomass product is rotated in the apparatus in both an anticlockwise and clockwise direction.

Preferably, the process further comprises a step of cooling the solid biomass fuel after heating step (v) and prior to step (vi) of removing dust particles from the solid biomass fuel.

Typically, step (vi) of removing dust particles from the solid biomass fuel comprises removing dust particles from the solid biomass fuel with a screen. Typically, the screen has a pore size of from 2 mm to 8 mm, preferably wherein the screen has a pore size of from 2 mm to 5 mm, and more preferably wherein the screen has a pore size of from 2 mm to 3 mm. In some embodiments, a drum sieve is used to as a screening device to remove the dust particles from the solid biomass fuel, preferably wherein the drum sieve comprises a rotating drum sieve.

Alternatively or additionally, step (vi) of removing dust particles from the solid biomass fuel comprises subjecting the solid biomass fuel to vibration, rotation, rolling, or any combination thereof. In some embodiments, step (vi) of removing dust particles from the solid biomass fuel comprises using a vibrating screen, wherein the vibrating screen has a pore size of from 2 mm to 8 mm, preferably wherein the screen has a pore size of from 2 mm to 5 mm, and more preferably wherein the screen has a pore size of from 2 mm to 3 mm.

Typically, the bulk density of the solid biomass fuel as determined according to DIN EN 15103 is from 0.55 kg/l to 0.8 kg/l, preferably from 0.60 kg/l to 0.75 kg/l, and more preferably from 0.60 to 0.70 kg/L.

Typically, the mechanical durability of the solid biomass fuel as determined according to DIN EN 15210-1 is 90% or more, 93% or more, or 95% or more.

In some embodiments of the process, the one or more sources of biomass, and solid biomass fuel are as follows:
(i) the one or more sources of biomass comprise or consist essentially of bagasse, and wherein the solid biomass fuel has a bulk density of from 0.60 kg/L to 0.65 kg/L, and wherein the mechanical durability of the solid biomass fuel is 95% or higher;
(ii) the one or more sources of biomass comprise or consist essentially of sunflower stalks, and wherein the solid biomass fuel has a bulk density of from 0.60 kg/L to 0.65 kg/L, and wherein the mechanical durability of the solid biomass fuel is 95% or higher;
(iii) the one or more sources of biomass comprise or consist essentially of wheat stalks, and wherein the solid biomass fuel has a bulk density of from 0.58 kg/L to 0.65 kg/L, and wherein the mechanical durability of the solid biomass fuel is 95% or higher;
(iv) the one or more sources of biomass comprise or consist essentially of corn stalks, and wherein the solid biomass fuel has a bulk density of from 0.61 kg/L to 0.66 kg/L, and wherein the mechanical durability of the solid biomass fuel is 96% or higher;
(v) the one or more sources of biomass comprise or consist essentially of sorghum stalk, and wherein the solid biomass fuel has a bulk density of from 0.62 kg/L to 0.66 kg/L, and wherein the mechanical durability of the solid biomass fuel is 97% or higher;
(vi) the one or more sources of biomass comprise or consist essentially of soybean stalks, and wherein the solid biomass fuel has a bulk density of from 0.61 kg/L to 0.66 kg/L, and wherein the mechanical durability of the solid biomass fuel is 96% or higher;
(vii) the one or more sources of biomass comprise or consist essentially of peanut stalks, and wherein the solid biomass fuel has a bulk density of from 0.62 kg/L to 0.68 kg/L, and wherein the mechanical durability of the solid biomass fuel is 97% or higher;
(viii) the one or more sources of biomass comprise or consist essentially of cotton stalk, and wherein the solid biomass fuel has a bulk density of from 0.62 kg/L to 0.68 kg/L, and wherein the mechanical durability of the solid biomass fuel is 98% or higher;
(ix) the one or more sources of biomass comprise or consist essentially of rape stalk, and wherein the solid biomass fuel has a bulk density of from 0.58 kg/L to 0.65 kg/L, and wherein the mechanical durability of the solid biomass fuel is 98% or higher;
(x) the one or more sources of biomass comprise or consist essentially of coconut shell, and wherein the solid biomass fuel has a bulk density of from 0.62 kg/L to 0.72 kg/L, and wherein the mechanical durability of the solid biomass fuel is 98% or higher;
(xi) the one or more sources of biomass comprise or consist essentially of palm husks, and wherein the solid biomass fuel has a bulk density of from 0.62 kg/L to 0.70 kg/L, and wherein the mechanical durability of the solid biomass fuel is 98% or higher;
(xii) the one or more sources of biomass comprise or consist essentially of seaweed, and wherein the solid biomass fuel has a bulk density of from 0.61 kg/L to 0.66 kg/L, and wherein the mechanical durability of the solid biomass fuel is 96% or higher;
(xiii) the one or more sources of biomass comprise or consist essentially of peanut hulls, and wherein the solid biomass fuel has a bulk density of from 0.61 kg/L to 0.66 kg/L, and wherein the mechanical durability of the solid biomass fuel is 97% or higher;
wherein the bulk density is determined according to DIN EN 15103, and wherein the mechanical durability is determined according to DIN EN 15210-1.

Typically, the total dry sulphur content of the biomass solid fuel is 0.5 wt % or less, preferably 0.45 wt % or less, more preferably 0.40 wt % or less, and most preferably from 0.15% to 0.20%, wherein the total dry sulphur content is determined according to DIN EN 15289.

Typically, the total dry hydrogen content of the biomass solid fuel is 3 wt % or more, preferably from 5 wt % to 10 wt %, and more preferably from 5 wt % to 7 wt %, wherein the total dry hydrogen content is determined according to DIN EN 15104.

Typically, the total dry oxygen content of the biomass solid fuel is 20 wt % or more, preferably from 25 wt % to 42 wt %, more preferably from 28 wt % to 40 wt %, wherein the total dry oxygen content is determined according to DIN EN 15296.

Typically, the total dry carbon content of the biomass solid fuel is 40 wt % or more, preferably from 45 wt % to 65 wt %, and more preferably from 50 wt % to 60 wt %, wherein total dry carbon content is determined according to DIN EN 15104.

Typically, the total dry nitrogen content of the biomass solid fuel is less than 5.0 wt %, preferably less than 3.0 wt % and more preferably less than 2.5 wt %, wherein the total dry nitrogen content is determined according to DIN EN 15104.

Typically, the chemical oxygen demand (COD) of the solid biomass fuel when immersed in water is 5000 ppm or less, preferably 4000 ppm or less, and most preferably 3200 ppm or less, wherein the chemical oxygen demand is determined according to GB/11914-89.

Typically, the fixed carbon content of the solid biomass fuel is 20 wt % or more, preferably from 25 wt % to 45 wt %, wherein the fixed carbon content is determined according to DIN EN 51734.

Typically, the ash content of the solid biomass fuel is less than 20 wt %, preferably less than 18 wt %, and more preferably less than 10 wt %, wherein the ash content is determined according to EN 14775 at 550° C.

Typically, the volatile matter content of the solid biomass fuel is from 35 wt % to 80 wt %, more preferably from 40 wt % to 80 wt %, and most preferably from 50 wt % to 80 wt %, wherein the volatile matter content is determined according to DIN EN 15148.

Typically, the internal moisture content of the solid biomass fuel is less than 8 wt %, preferably less than 6 wt %, and more preferably less than 5 wt %, wherein the internal moisture content is determined according to DIN EN 14774.

Typically, the biomass solid fuel has a calorific value of from 4300 kcal/kg to 6500 kcal/kg, and preferably 4800 kcal/kg to 5800 kcal/kg, wherein the calorific value is determined in accordance with DIN EN 14918.

Typically, the biomass solid fuel has a base moisture content of less than 10 wt %, preferably less than 8 wt %, and most preferably less than 6 wt %, wherein the base moisture content is determined according to GB/T 211-2017.

Typically, the pH of the solid biomass fuel is from 4 to 10.

Typically, the coke residue of the solid biomass fuel upon combustion is 1 to 4, preferably from 2 to 3.

Typically, the solid biomass fuel is waterproof for up to 20 days, preferably up to 30 days, and more preferably up to 40 days.

Typically, the PM1.0 emissions of the solid biomass fuel upon combustion is less than 175 mg/kg, preferably less than 150 mg/kg.

Typically, the bulk density of the molded biomass product is A, and the bulk density of the biomass solid fuel is B, and wherein B/A is 0.55 to 1, wherein the bulk density is determined in accordance with DIN EN 15103.

Preferably, material derived from biomass is present in the solid biomass fuel in an amount of at least 95% by weight of the total fuel content of the solid biomass fuel.

According to a second aspect of the invention, there is provided a solid biomass fuel obtainable or obtained by a process according to any preceding claim.

According to a third aspect of the invention, there is provided a solid biomass fuel derived from one or more sources of biomass, wherein the one or more sources of biomass:

(i) comprise, consist of, or consist essentially of bagasse;
(ii) comprise, consist of, or consist essentially of sunflower stalks;
(iii) comprise, consist of, or consist essentially of wheat stalks;
(iv) comprise, consist of, or consist essentially of corn stalks;
(v) comprise, consist of, or consist essentially of soybean stalks;
(vi) comprise, consist of, or consist essentially of sorghum stalks;
(vii) comprise, consist of, or consist essentially of peanut stalks;
(viii) comprise, consist of, or consist essentially of cotton stalks;
(ix) comprise, consist of, or consist essentially of rape stalks;
(x) comprise, consist of, or consist essentially of coconut husks;
(xi) comprise, consist of, or consist essentially of palm husks;
(xii) comprise, consist of, or consist essentially of seaweed; or
(xiii) comprise, consist of, or consist essentially of peanut hulls.

Preferably, the one or more sources of biomass or solid biomass fuel in the second and third aspects of the invention are as defined above in accordance with the first aspect of the invention.

According to a fourth aspect of the invention, there is provided a combustion process comprising the step of combusting a solid biomass fuel in accordance with the second or third aspects of the present invention so as to produce energy.

Preferably, the solid biomass fuel is co-fired and combusted alongside a fossil fuel such as coal.

Preferably, the PM1.0 emissions of the process are less than 175 mg/kg, and preferably less than 150 mg/kg.

Preferably, the coke residue of the solid biomass fuel upon combustion is 1 to 4, preferably from 2 to 3.

According to a fifth aspect of the invention, there is provided the use of a solid biomass fuel according to the second or third aspects of the invention as a fuel in a combustion process, optionally wherein the use comprises using the solid biomass fuel in a process according to the fourth aspect of the invention, optionally wherein the combustion process comprises co-firing the solid biomass fuel alongside a fossil fuel, such as coal.

Preferably, the PM1.0 emissions of the process are less than 175 mg/kg, and preferably less than 150 mg/kg.

Preferably, the coke residue of the solid biomass fuel upon combustion is 1 to 4, preferably from 2 to 3.

According to a sixth aspect of the invention, there is provided the use of one or more sources of biomass to produce a solid biomass fuel, wherein the one or more sources of biomass: (i) comprise, consist of, or consist essentially of bagasse; (ii) comprise, consist of, or consist essentially of sunflower stalks; (iii) comprise, consist of, or consist essentially of wheat stalks; (iv) comprise, consist of, or consist essentially of corn stalks; (v) comprise, consist of, or consist essentially of soybean stalks; (vi) comprise, consist of, or consist essentially of sorghum stalks; (vii) comprise, consist of, or consist essentially of peanut stalks; (viii) comprise, consist of, or consist essentially of cotton stalks; (ix) comprise, consist of, or consist essentially of rape stalks; (x) comprise, consist of, or consist essentially of coconut husks; (xi) comprise, consist of, or consist essentially of palm husks; (xii) comprise, consist of, or consist essentially of seaweed; or (xiii) comprise, consist of, or consist essentially of peanut husks.

Preferably, the wherein the use comprises using the one or more sources of biomass in a process according to the first aspect of the invention, and/or wherein the solid biomass fuel is in accordance with the second or third aspects of the invention.

According to a seventh aspect of the invention, there is provided a pre-treatment process for pre-treating one or more sources of biomass for use in the production of a solid biomass fuel, wherein the pre-treatment process comprises the following steps:
(i) providing one or more sources of biomass with an average particle diameter (D50) of from 30,000 µm to 60,000 µm;
(ii) pulverising the one or more sources of biomass to provide a pulverised biomass powder with an average particle diameter (D50) of from 1000 µm to 10,000 µm;
(iii) drying the pulverised biomass powder so as to provide a dried pulverised biomass powder,
wherein the one or more sources of biomass comprise bagasse, sunflower stalks, wheat stalks, corn stalks, sorghum stalks, soybean stalk, peanut stalks, cotton stalks, rape stalks, coconut husks, palm husks, seaweed, peanut hulls, or a combination thereof.

Typically, step (i) of providing one or more sources of biomass with an average particle diameter (D50) of from 30,000 µm to 60,000 µm comprises chopping the one or more sources of biomass so as to have an average particle diameter (D50) of from 30,000 µm to 60,000 µm.

Typically, step (ii) of pulverising the one or more sources of biomass to provide a pulverised biomass powder with an average particle diameter (D50) of from 1000 µm to 10,000 µm comprises (a) crushing the one or more sources of biomass in a process involving the use of a negative pressure pneumatic conveyancing apparatus where the moisture content of the one or more sources of biomass is 20% by weight or less.

Typically, step (iii) of drying the pulverised biomass powder so as to provide a dried pulverised biomass powder comprises drying the pulverised biomass in a drying cylinder. Typically, where the moisture content of the pulverised biomass powder is 20% by weight or less, the process comprises drying the pulverised biomass in a single drying cylinder. Typically, where the moisture content of the pulverised biomass powder is 20% by weight or more, the process comprises drying the pulverised biomass in multiple drying cylinders.

Typically, step (iii) of drying the pulverised biomass powder so as to provide a dried pulverised biomass powder further comprises mixing the pulverised biomass powder particles whilst drying.

Preferably, the one or more sources of biomass are as defined above in accordance with the first aspect of the invention.

Typically, the pre-treatment process is carried out prior to a process of producing a solid biomass fuel, wherein the process of producing a solid biomass fuel comprises a step of molding or heating one or more sources of biomass, optionally wherein the process is as defined above in accordance with the first aspect of the invention.

According to an eighth aspect of the invention, there is provided a post-treatment process for post-treating a solid biomass fuel, wherein the post treatment process comprises a step of removing dust particles from the solid biomass fuel, wherein the solid biomass fuel is derived from one or more sources of biomass, wherein the one or more sources of biomass comprise bagasse, sunflower stalks, wheat stalks, corn stalks, sorghum stalks, soybean stalk, peanut stalks, cotton stalks, rape stalks, coconut husks, palm husks, seaweed, peanut hulls, or a combination thereof.

Preferably, the step of removing dust particles from the solid biomass fuel comprises removing dust particles from the solid biomass fuel with a screen. Preferably, the screen has a pore size of from 2 mm to 8 mm, preferably wherein the screen has a pore size of from 2 mm to 5 mm, and more preferably wherein the screen has a pore size of from 2 mm to 3 mm.

Typically, a drum sieve is used as a screening device to remove the dust particles from the solid biomass fuel, preferably wherein the drum sieve comprises a rotating drum sieve.

Additionally or alternatively, the step of removing dust particles from the solid biomass fuel comprises subjecting the solid biomass fuel to vibration, rotation, rolling, or any combination thereof. In some embodiments, the step of removing dust particles from the solid biomass fuel comprises using a vibrating screen, wherein the vibrating screen has a pore size of from 2 mm to 8 mm, preferably wherein the screen has a pore size of from 2 mm to 5 mm, and more preferably wherein the screen has a pore size of from 2 mm to 3 mm.

Typically, the post-treatment process of the invention is carried out after a process of producing a solid biomass fuel, wherein the process of producing a solid biomass fuel comprises a step of molding or heating one or more sources of biomass, optionally wherein the process is as defined above in accordance with the first aspect of the invention.

BRIEF DESCRIPTION OF THE DRAWINGS

The present inventions will now be described by way of example and with reference to the accompanying Figures in which.

DETAILED DESCRIPTION OF THE INVENTION

Sources of Biomass

Figure 1:
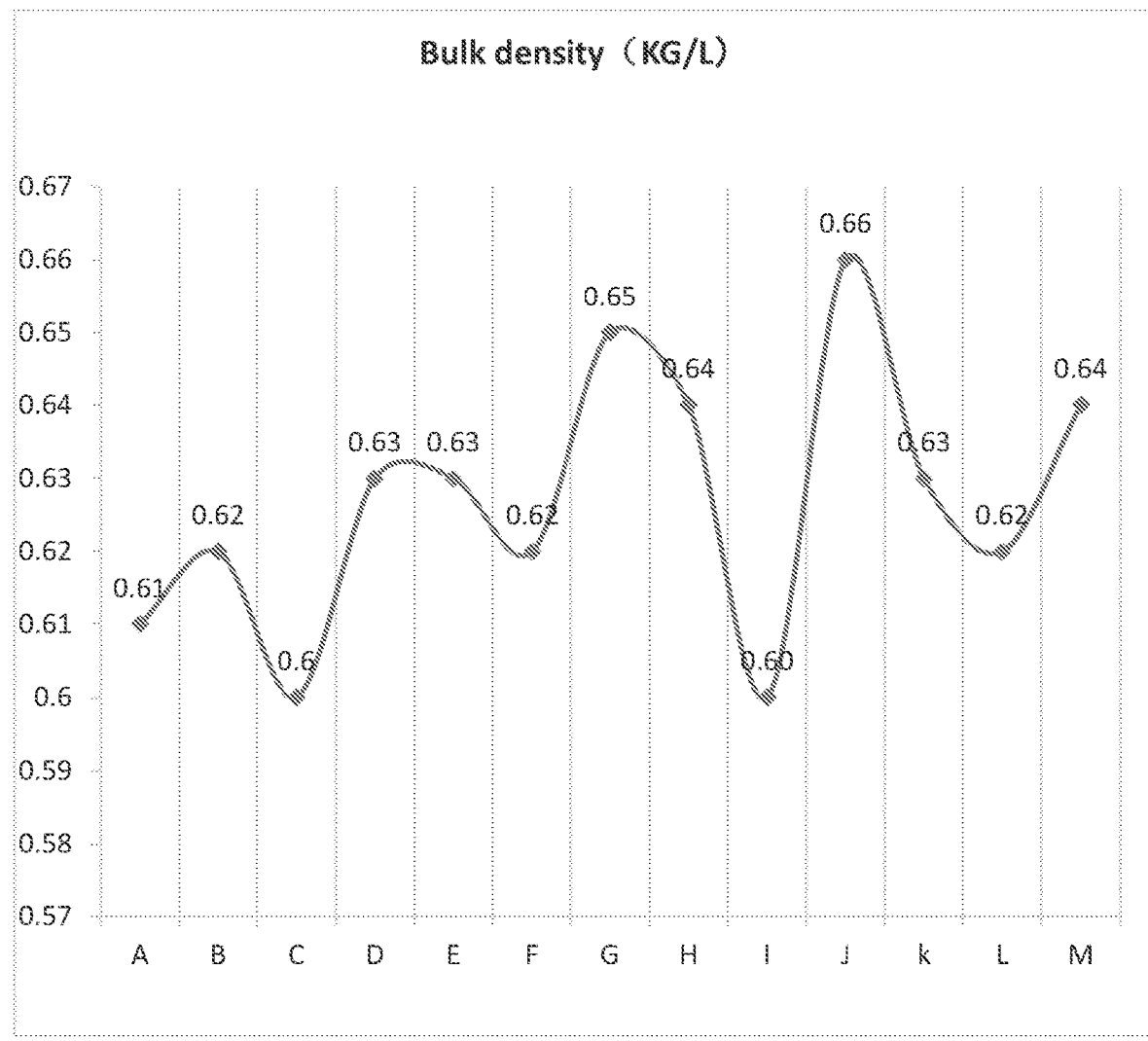
FIG. 1 shows the bulk density of various solid biomass fuels of the invention as determined by DIN EN ISO 17828.
Figure 2:
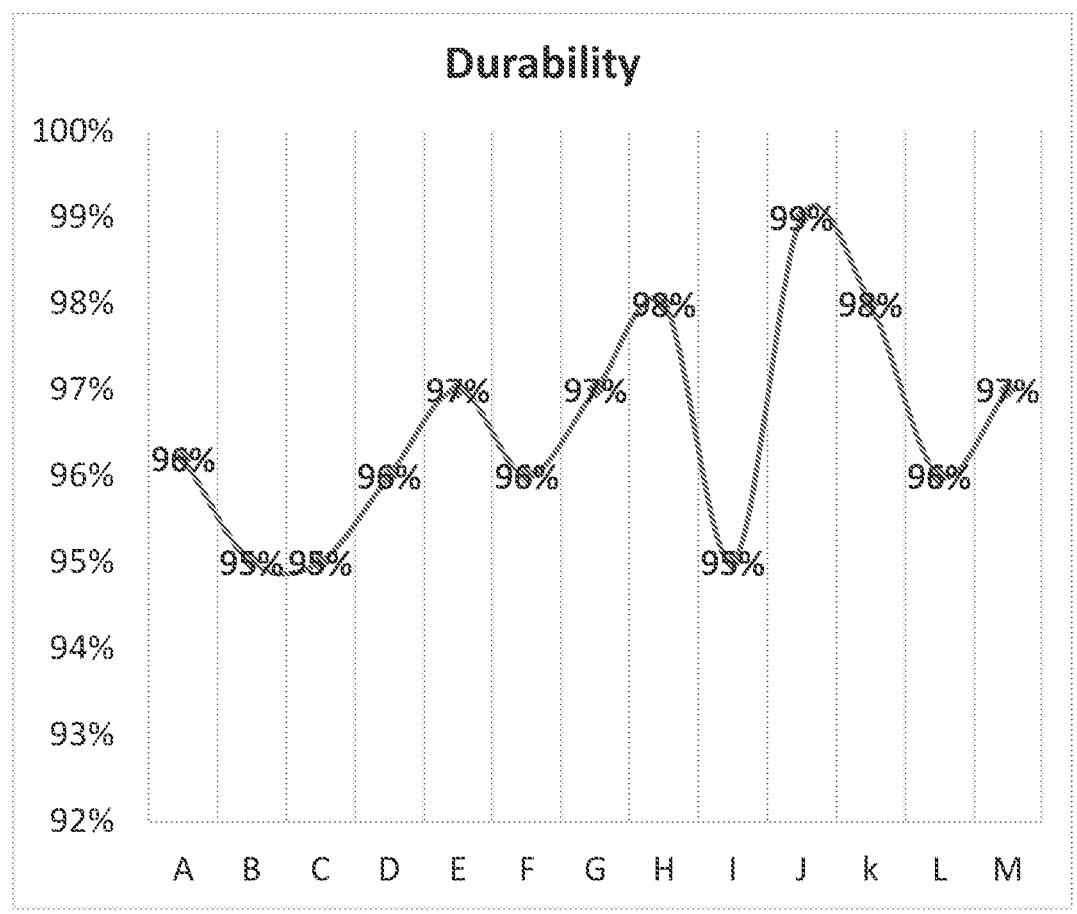
FIG. 2 shows the mechanical durability of various solid biomass fuels of the invention, as determined by DIN EN 15210-1.
Figure 3:
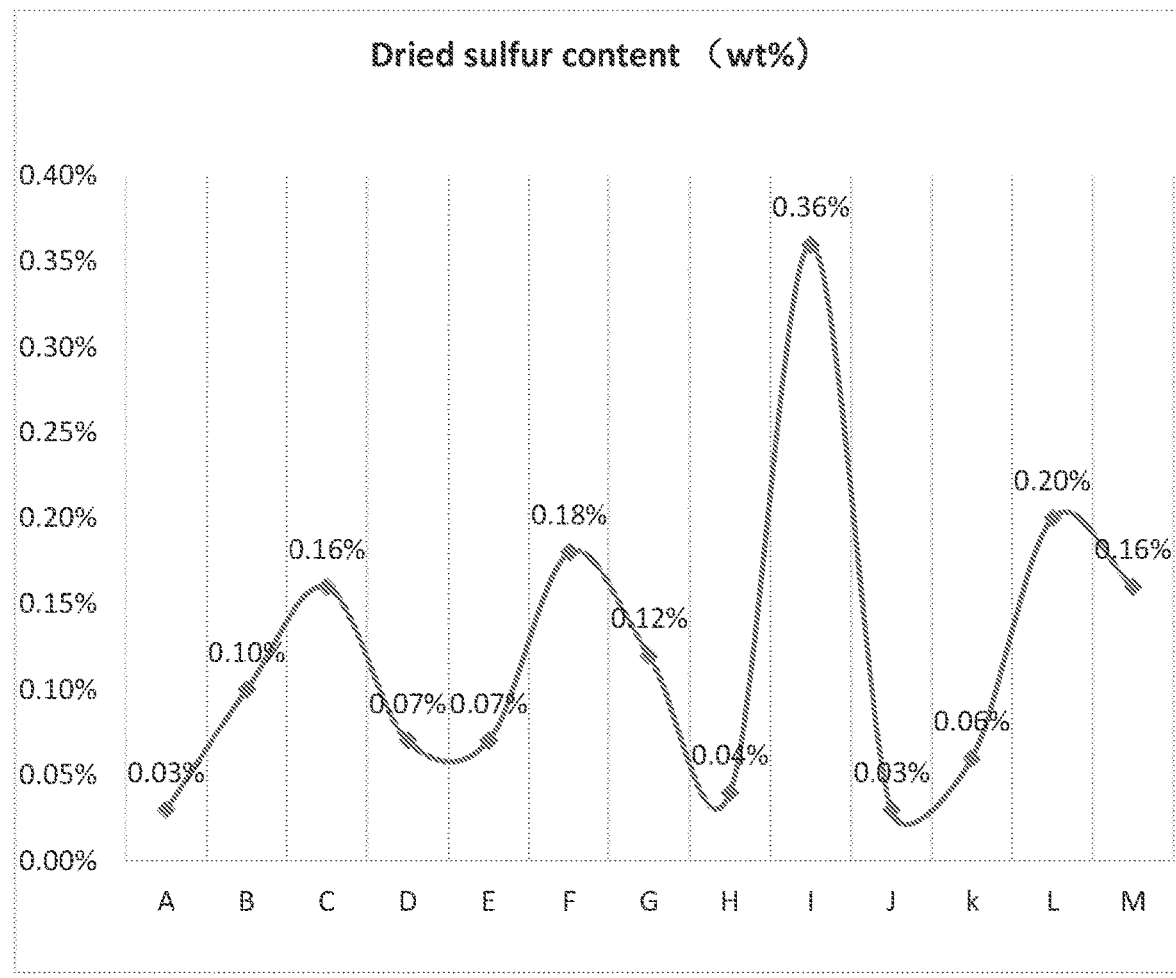
FIG. 3 shows the sulphur content of various biomass fuels of the invention, as determined by DIN EN 15289.
Figure 4:
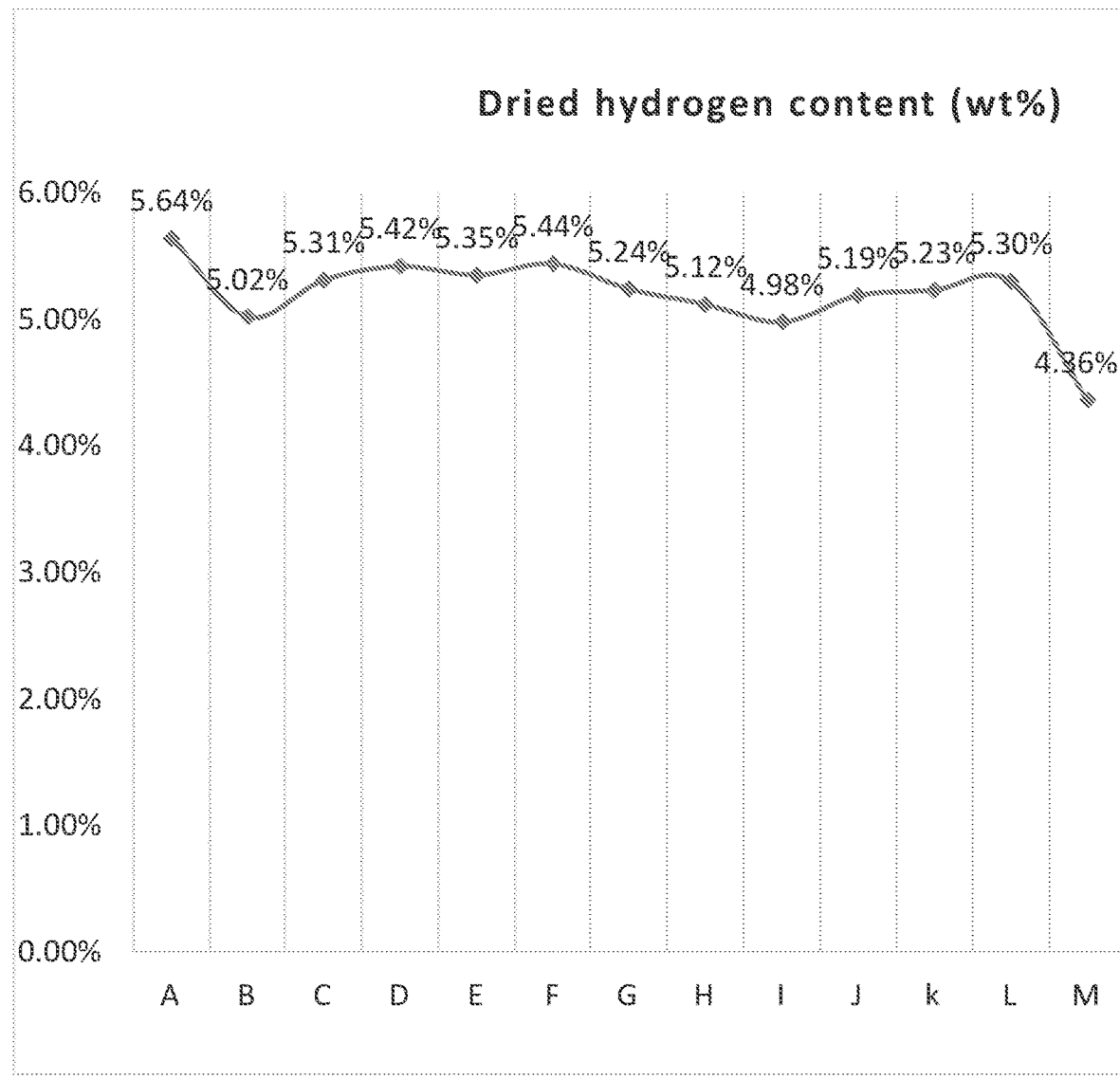
FIG. 4 shows the dry hydrogen content of various biomass fuels of the invention, as determined by DIN EN 15104.
Figure 5:
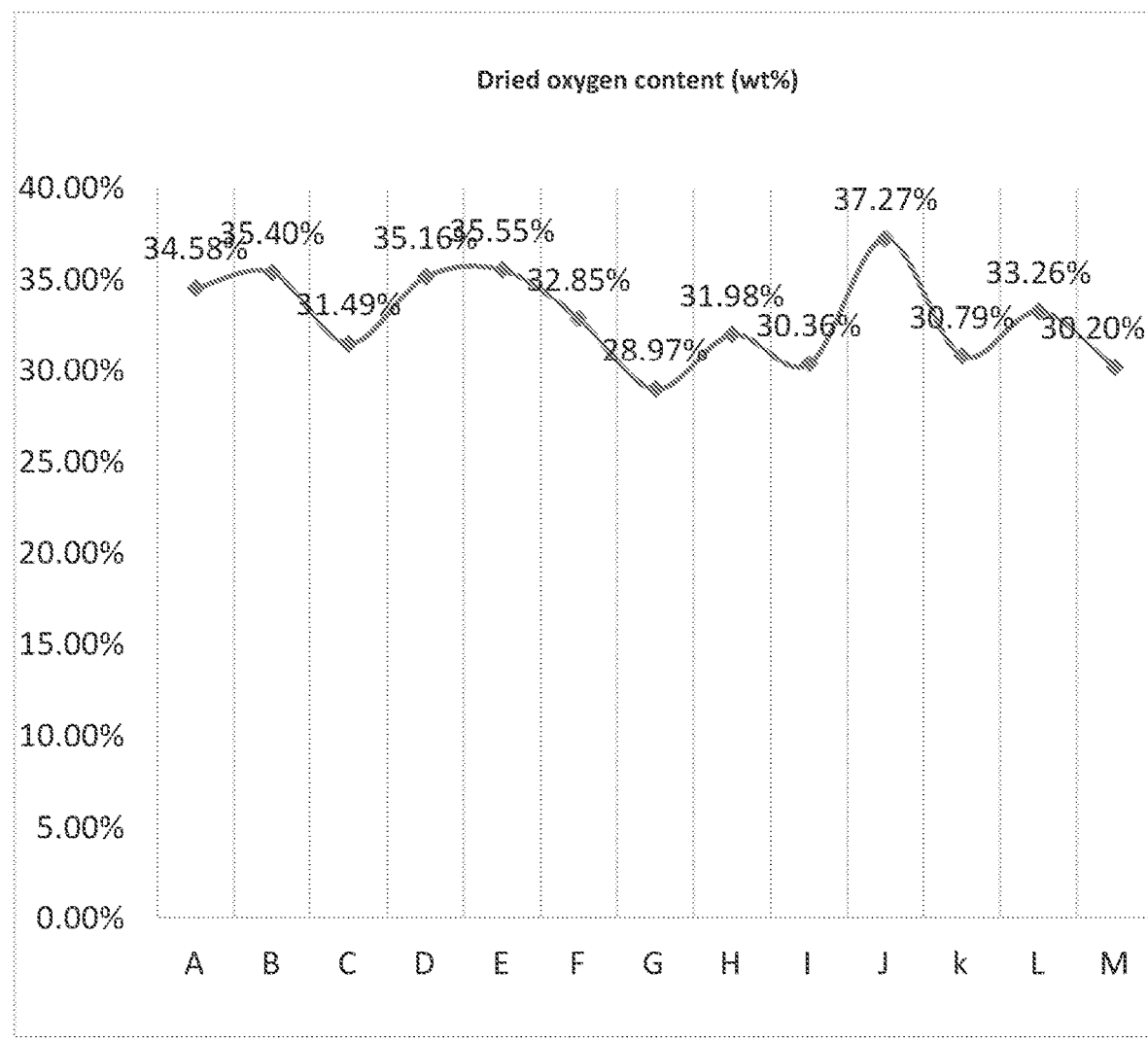
FIG. 5 shows the dry oxygen content of various biomass fuels of the invention, as determined by DIN EN 15296.
Figure 6:
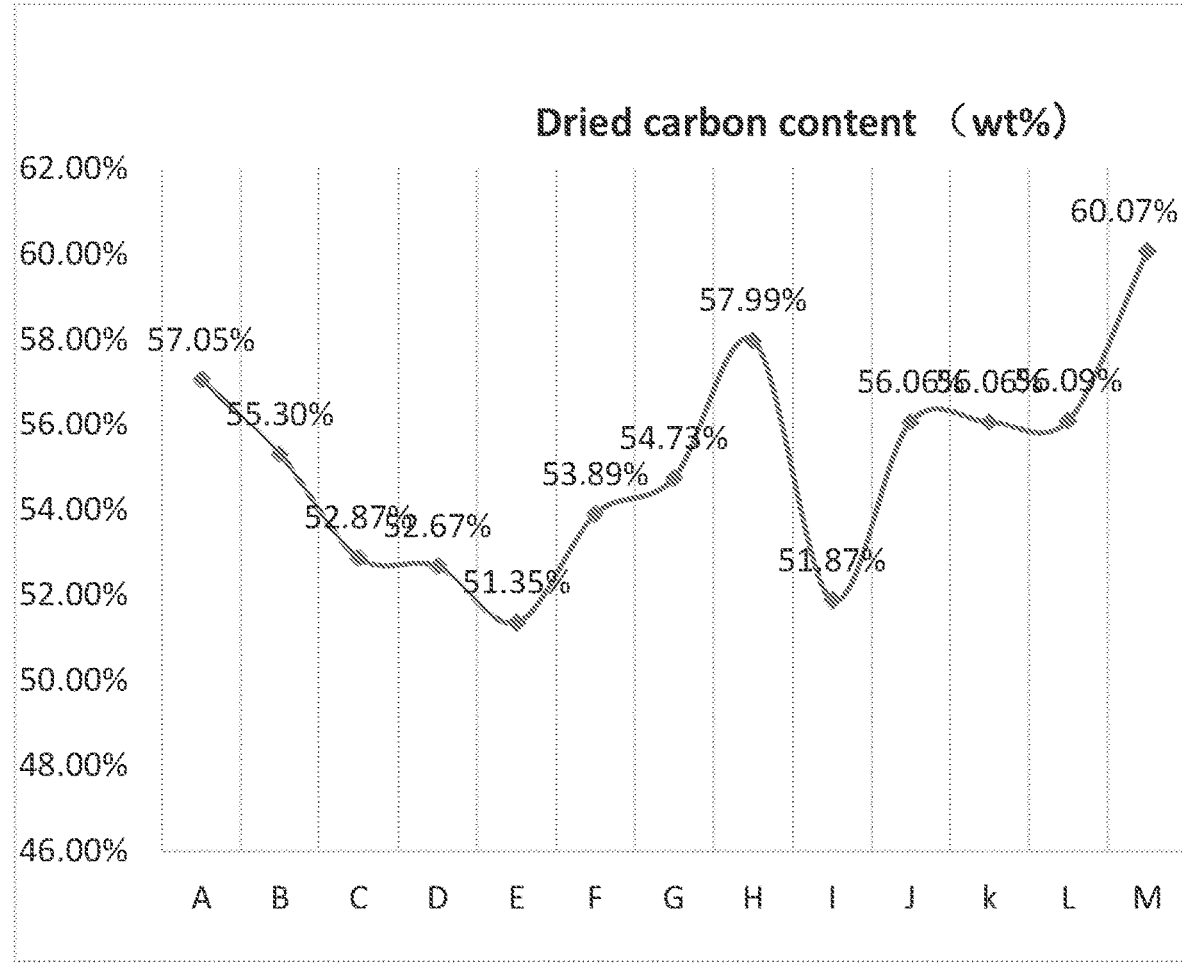
FIG. 6 shows the dry carbon content of various biomass fuels of the invention, as determined by DIN EN 15104.
Figure 7:
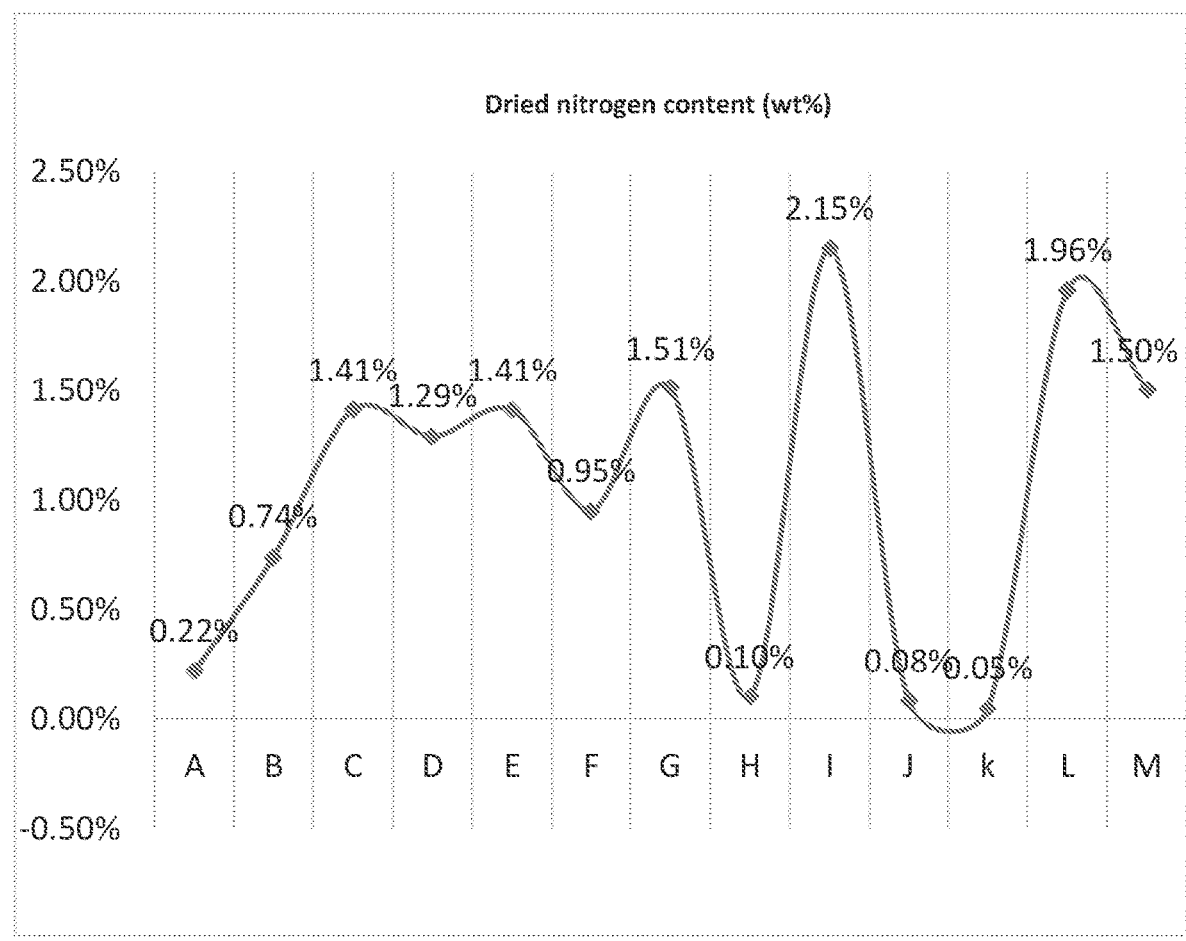
FIG. 7 shows the dry nitrogen content of various biomass fuels of the invention, as determined by DIN EN 15104.
Figure 8:
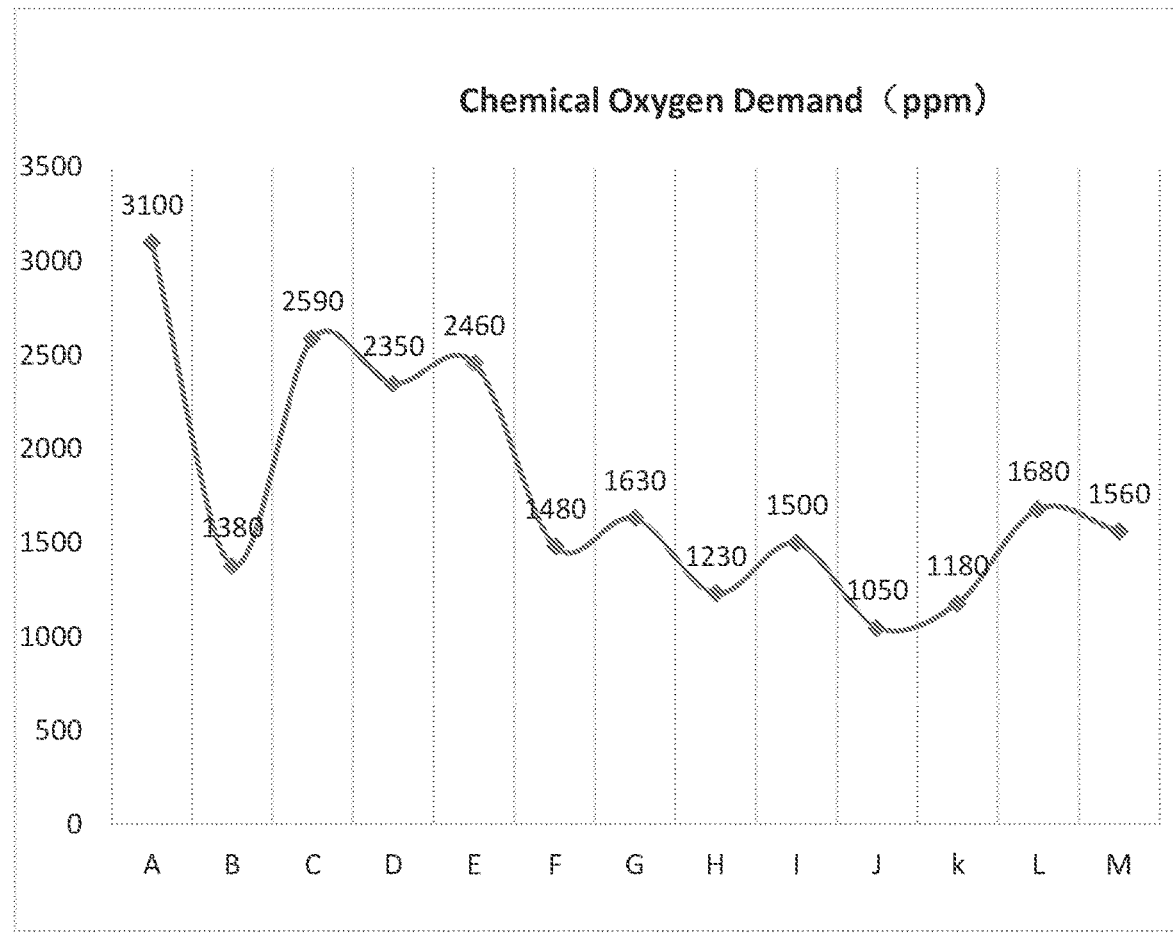
FIG. 8 shows the chemical oxygen demand (COD) of various biomass fuels of the invention, as determined by GB11914-89.
Figure 9:
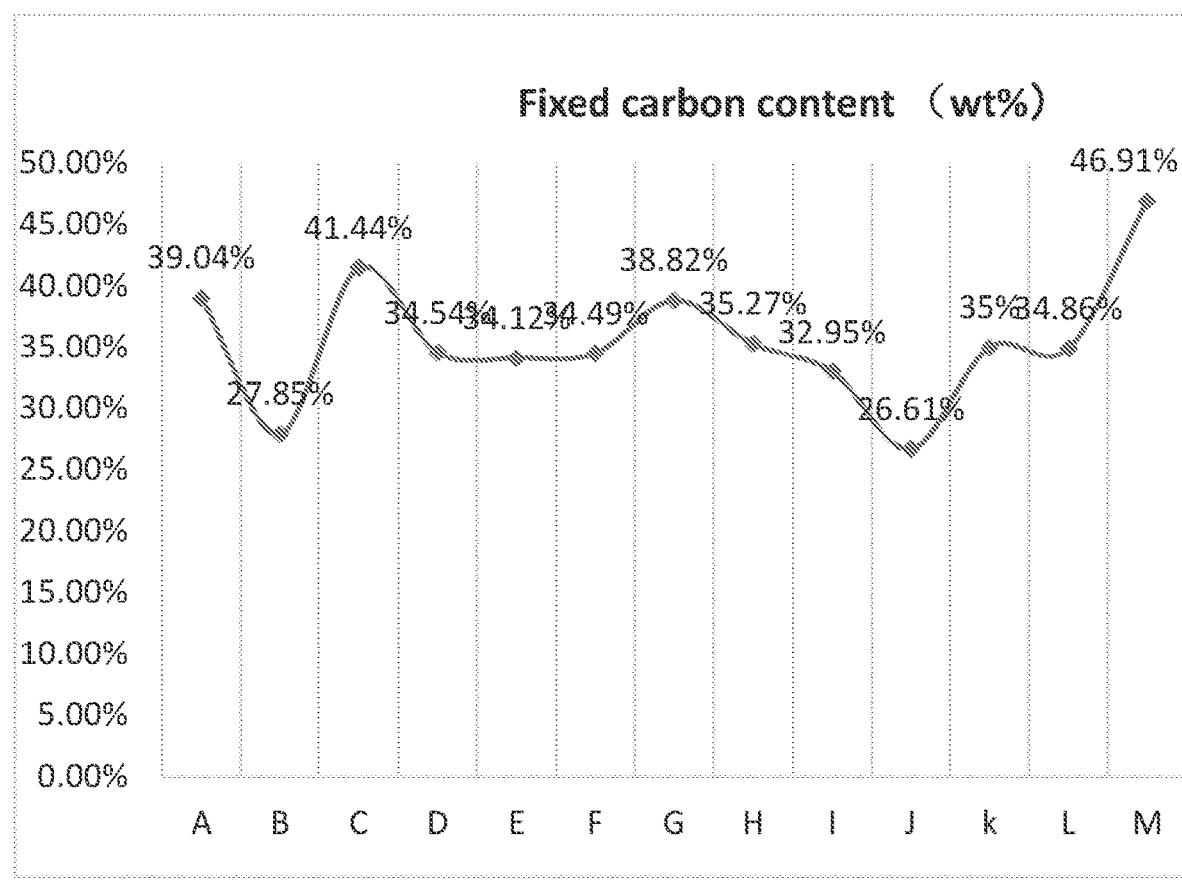
FIG. 9 shows the fixed carbon content of various biomass fuels of the invention, as determined by DIN EN 51734.
Figure 10:
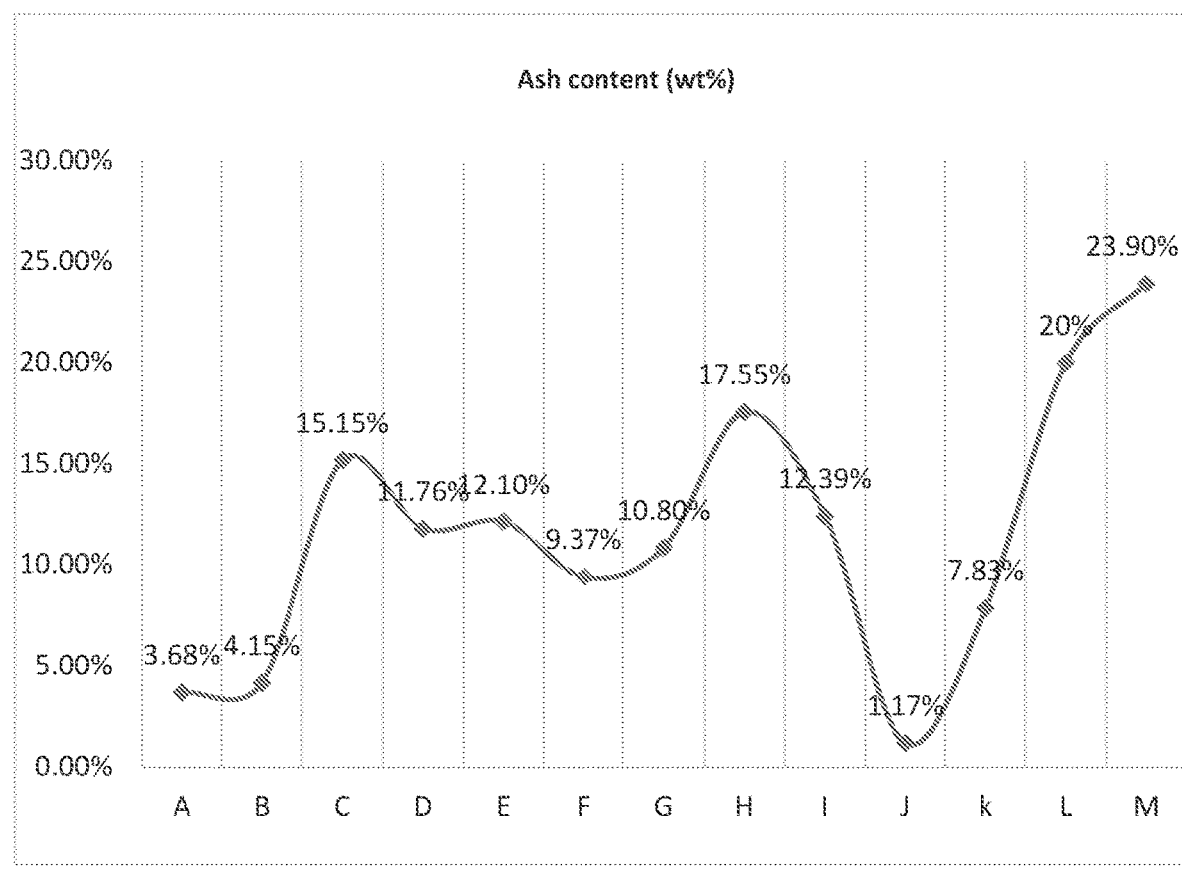
FIG. 10 shows the ash content of various biomass fuels of the invention, as determined by DIN EN 14775 at 550° C.
Figure 11:
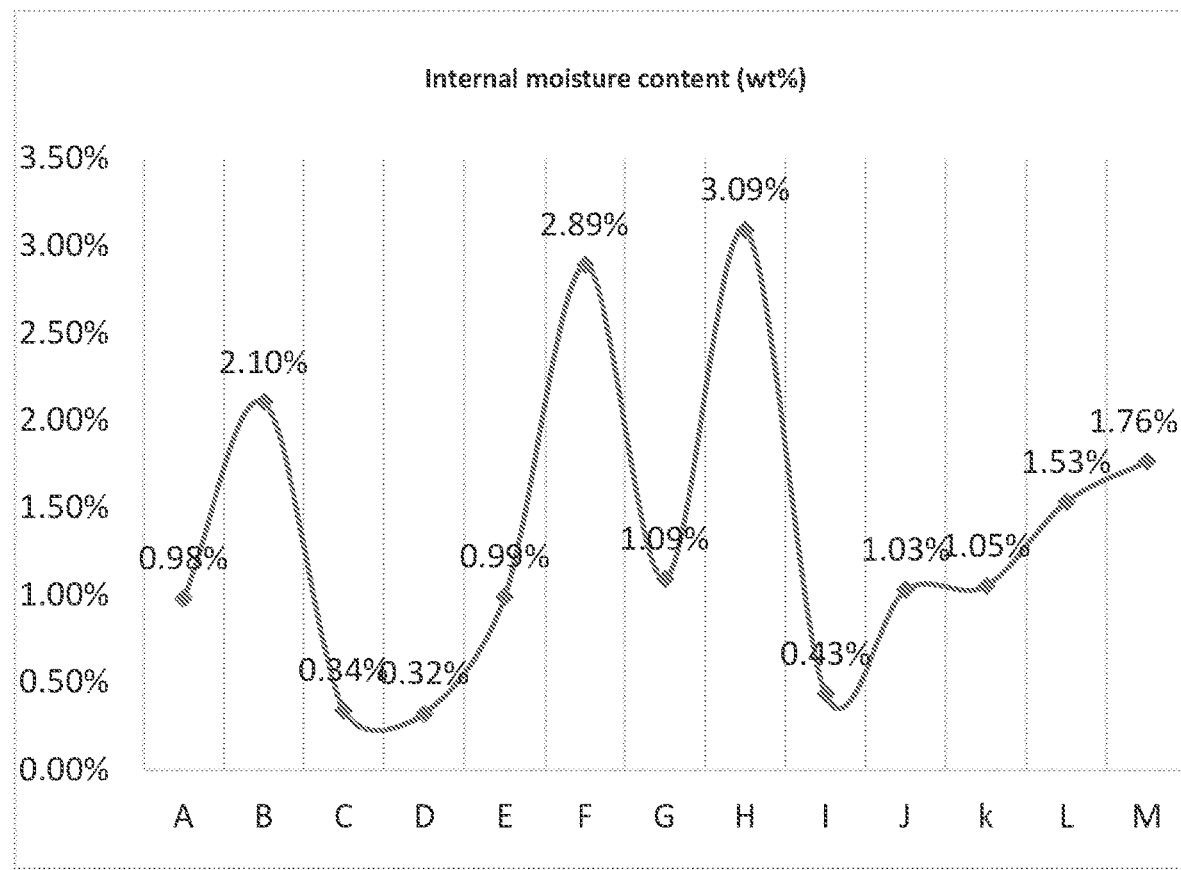
FIG. 11 shows the internal moisture content of various biomass fuels of the invention, as determined by DIN EN 14774-2.
Figure 12:
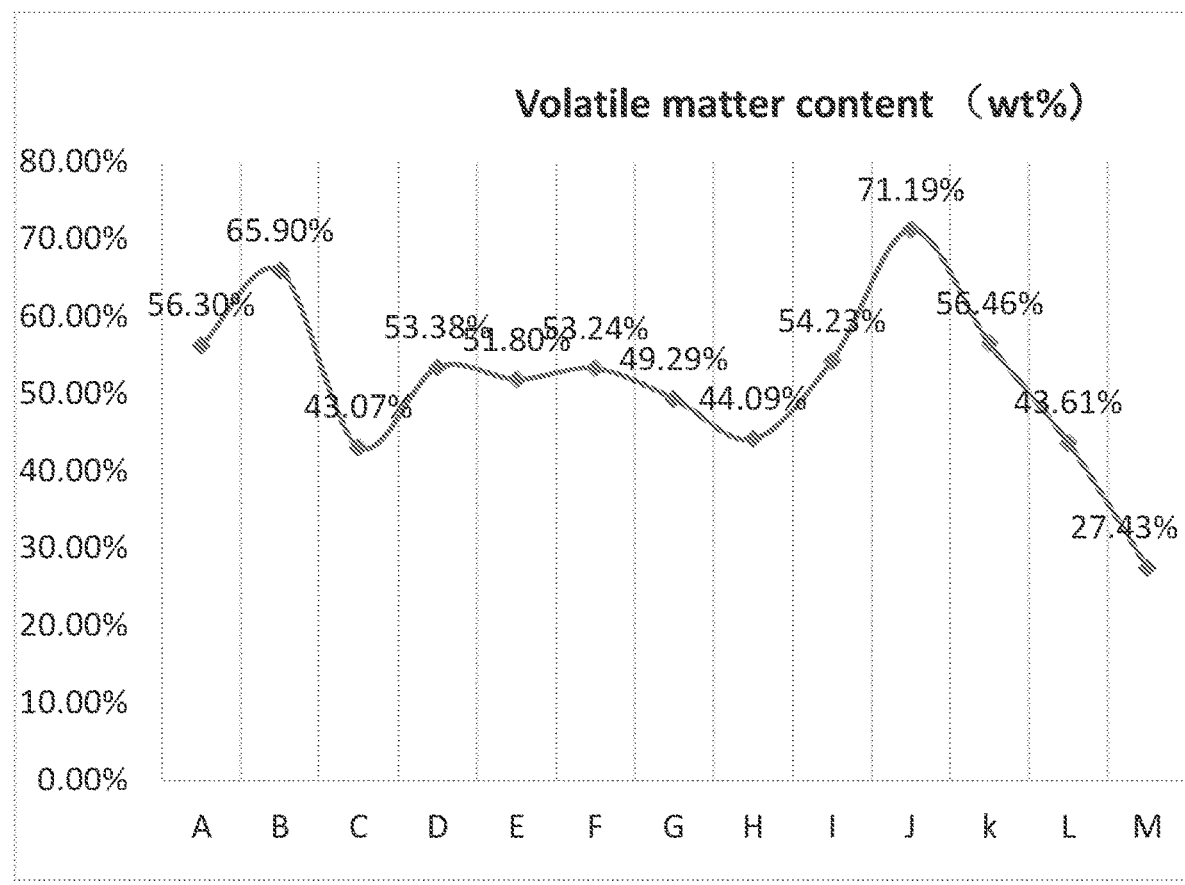
FIG. 12 shows the volatile matter content of various biomass fuels of the invention, as determined by DIN EN 15148.
Figure 13:
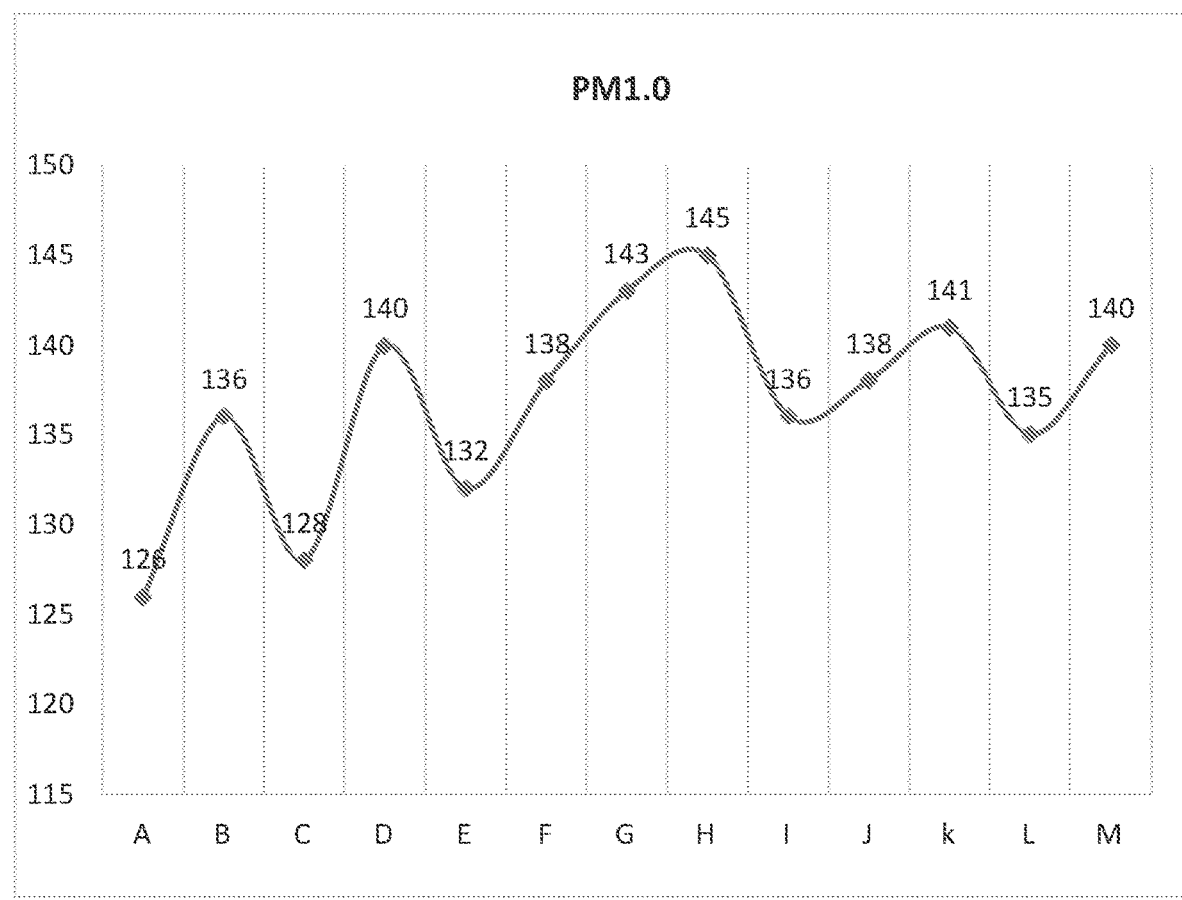
FIG. 13 shows the PM1.0 emissions of various biomass fuels of the invention, as determined by the standard method of the German ECN testing institute.
Figure 14:
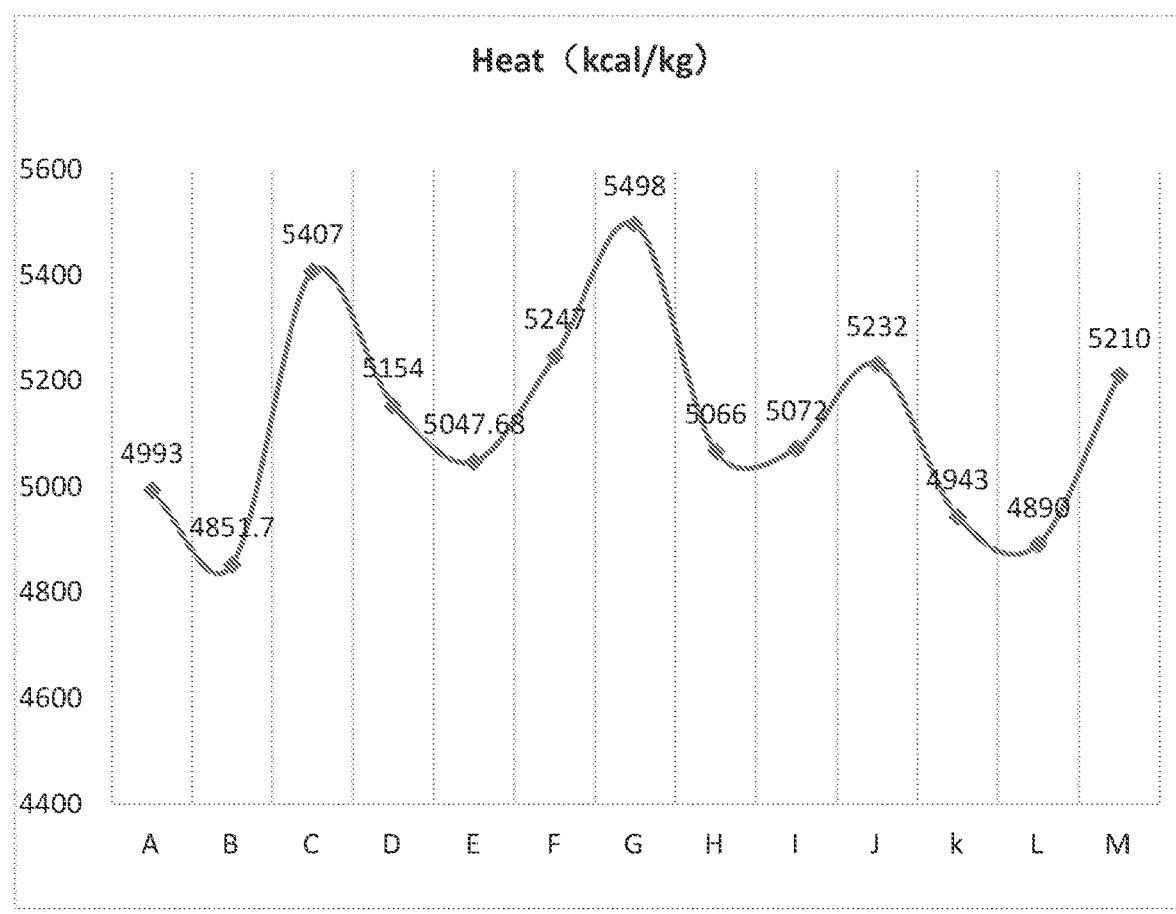
FIG. 14 shows the calorific value of various biomass fuels of the invention, as determined by DIN EN 14918.
Figure 15:
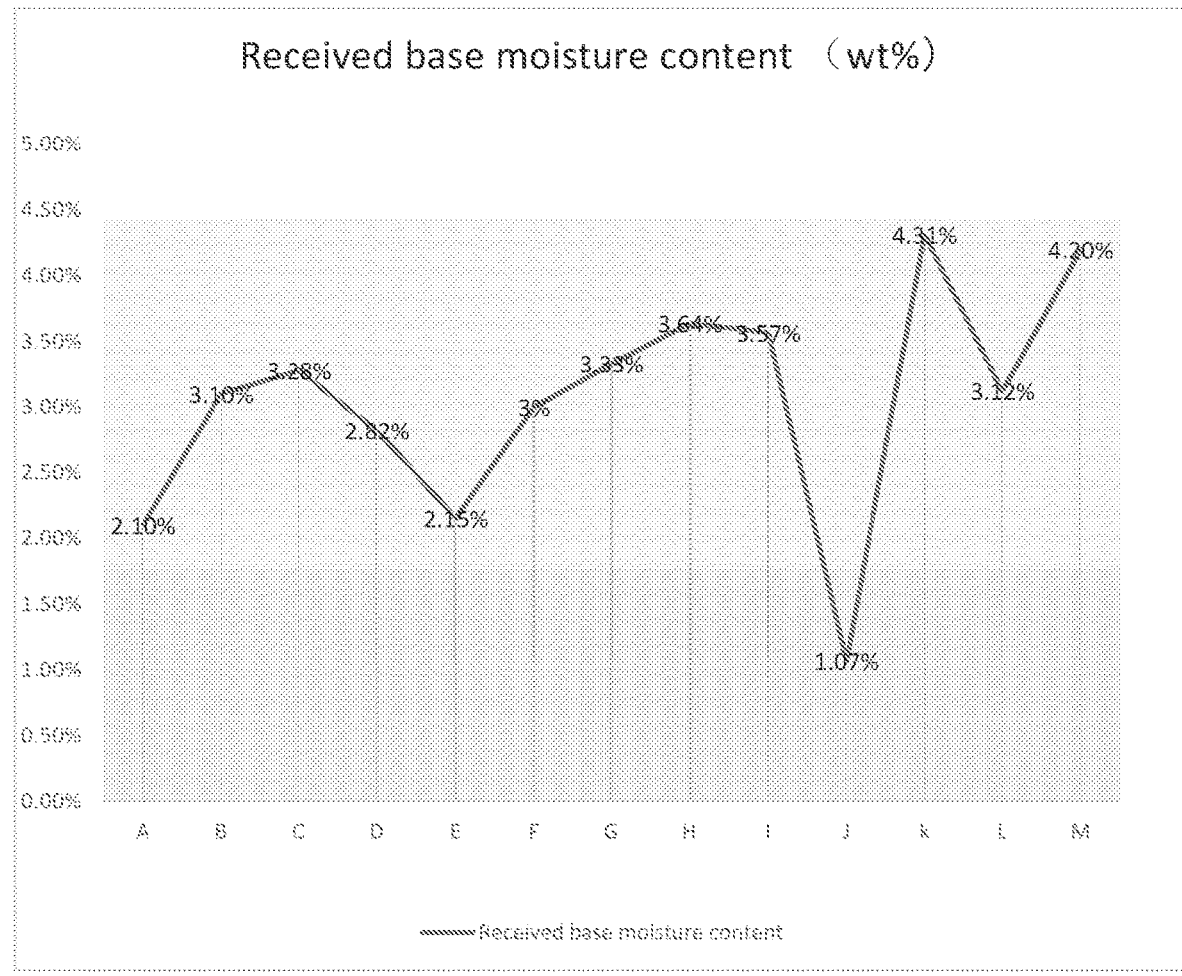
FIG. 15 shows the received base moisture content of various biomass fuels of the invention, as determined by GB/T211-2017.
Figure 16:
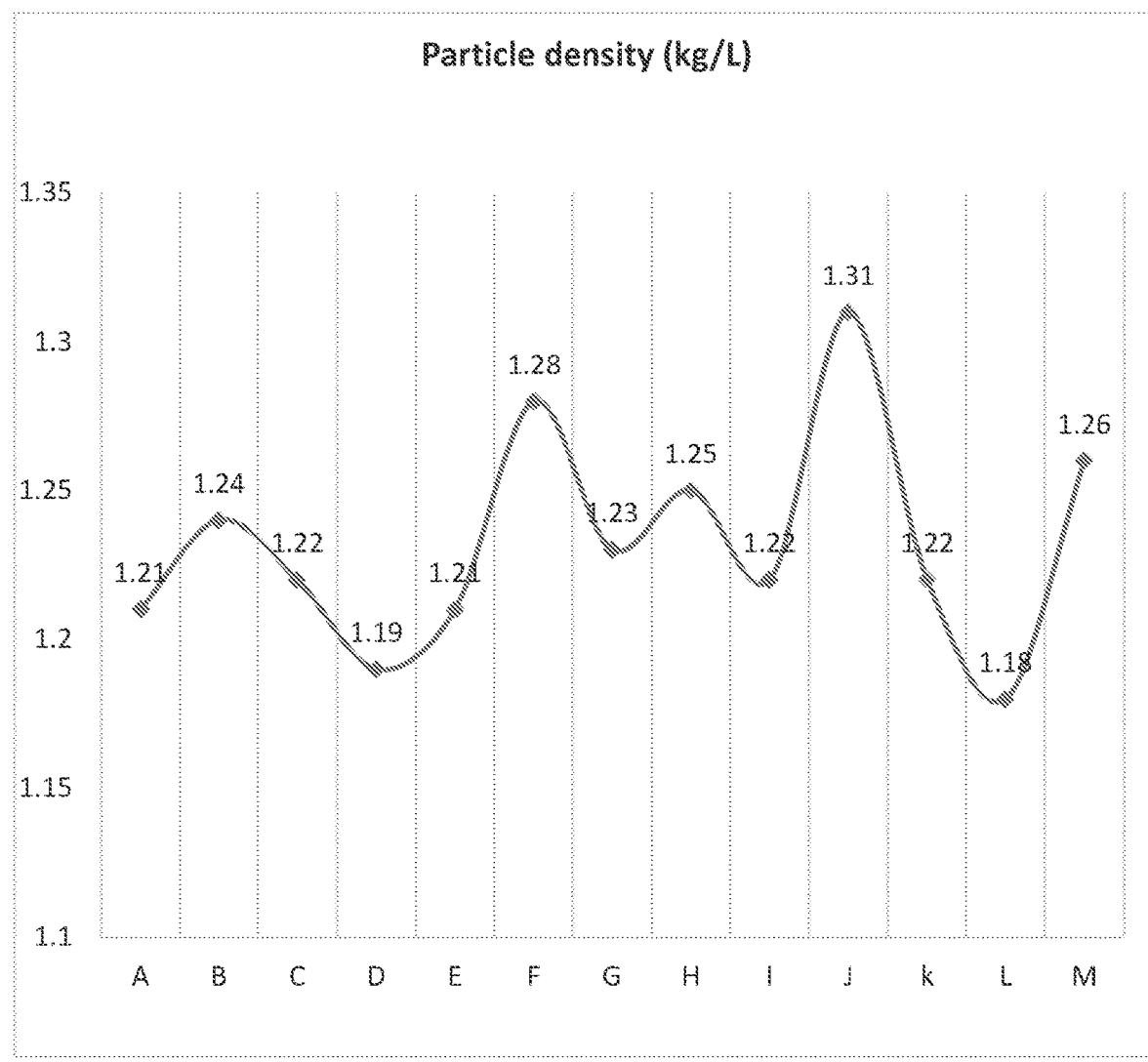
FIG. 16 shows the particle density of various biomass fuels of the invention, as determined by DIN EN 18847.
Figure 17:
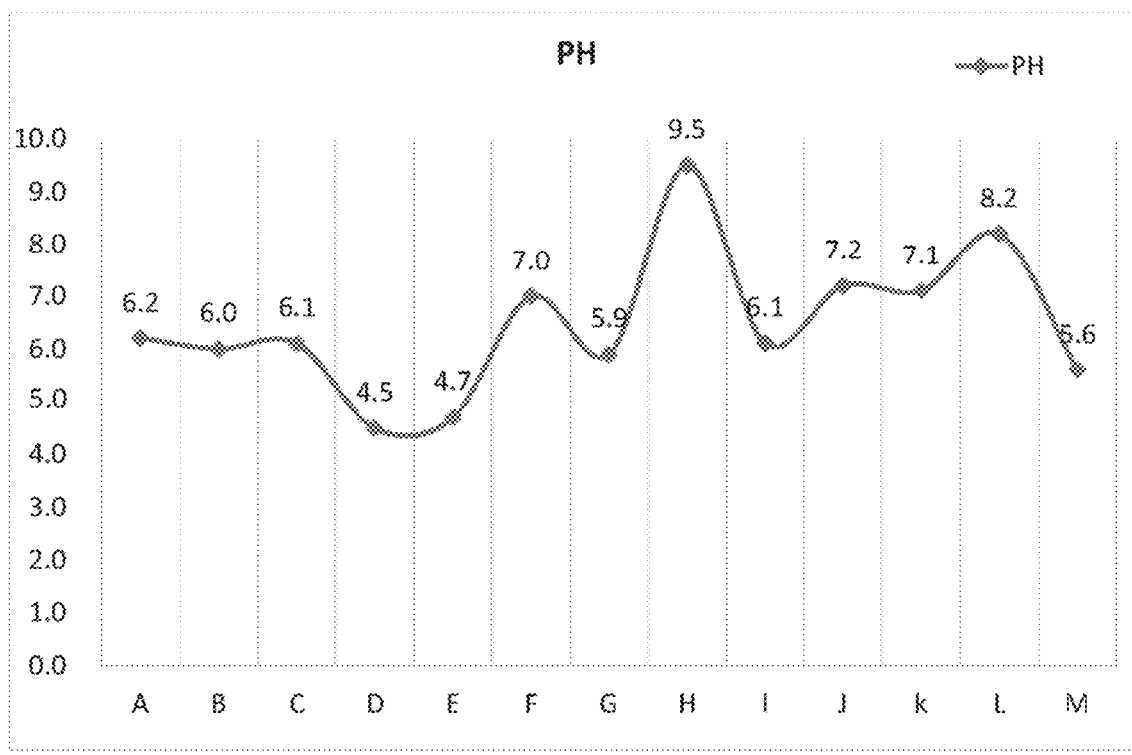
FIG. 17 shows the pH of various biomass fuels of the invention, as determined by GB/M7702.16-1997.
Figure 18:
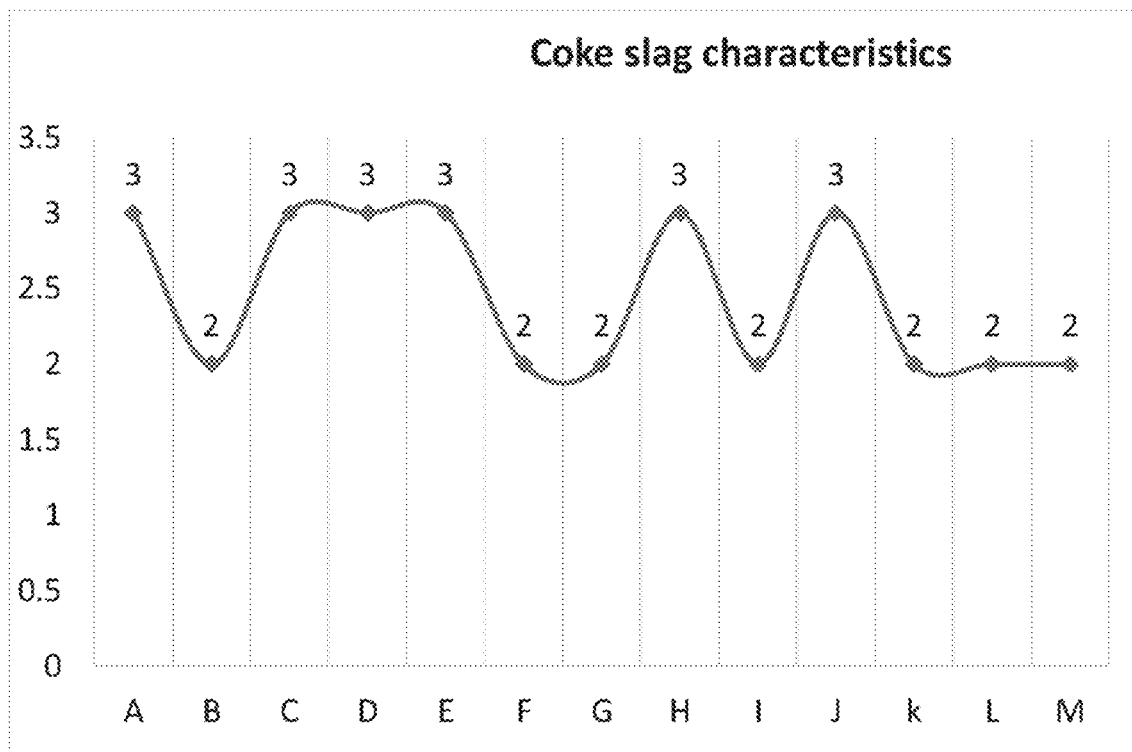
FIG. 18 shows the coke slag characteristics of various biomass fuels of the invention, as determined by GB/T212-2008.

The one or more sources of biomass used in accordance with the present invention can be any of those discussed above. Typically, the one or more sources of biomass comprise agricultural waste. Many of the sources of biomass described above for use in accordance with the invention can be agricultural waste. The term "agricultural waste" as used herein typically refers to plant-based waste products that are produced as a by-product of agricultural operations. For example, agricultural waste may comprise left over plant-based products that are harvested, or unwanted components of harvested plant-based products.

The sources of biomass used in accordance with the invention may be produced as agricultural waste as a by-product of an agricultural operation. Alternatively, these sources of biomass may be grown specifically for the purpose of being a feedstock for the preparation of biomass solid fuels. Corn stalks are a particular example of a material that may be produced as agricultural waste. For example, corn may be grown and harvested for human consumption. When processing corn plants for human consumption, the process may involve removing the edible corn from the inedible corn cob. The corn cob and stalk is thus an agricultural waste product. In some embodiments, the one or more sources of biomass comprise, consist of, or consist essentially of bagasse, sunflower stalks, wheat stalks, corn stalks, sorghum stalks, soybean stalk, peanut stalks, cotton stalks, rape stalks, coconut husks, palm husks, seaweed, peanut hulls, or a combination thereof. In preferred embodiments, the one or more sources of biomass consist essentially of or consist of bagasse, sunflower stalks, wheat stalks, corn stalks, sorghum stalks, soybean stalk, peanut stalks, cotton stalks, rape stalks, coconut husks, palm husks, seaweed, peanut hulls, or a combination thereof.

Each of the one or more sources of biomass discussed above can be obtained or harvested by conventional methods known in the art.

The term "comprising" as used herein is used to mean that any further undefined component can be present. The term "consisting" as used herein is used to mean that no further components can be present, other than those specifically listed. The term "consisting essentially of" as used herein is used to mean that further undefined components may be present, but that those components do not materially affect the essential characteristics of the composition.

As discussed above, it has been found that the one or more sources of biomass used in the present invention can be grown and harvested on a commercial scale, providing increased control of the quality and specific characteristics of the biomass source compared to the materials used in the prior art. Use of said materials also avoids the environmental damage associated with using trees such as necessary deforestation.

Use of the one or more sources of biomass used in the present invention has also surprisingly been found to be easier to grind than said prior used materials, such as wood. This reduces the costs of the grinding process.

Use of the materials of the invention, when ground, also provides a more homogenous mix of particle sizes than said prior used materials. Without being limited by theory, this is believed to impart advantageous properties to the final solid fuel product, such as greater uniformity and continuousness of the biomass fuel products. This is desirable in combustion processes for a number of reasons.

Providing One or More Sources of Biomass

As discussed above, the process of the invention comprises a step of providing one or more sources of biomass with an average particle diameter (D50) of from 30,000 µm to 60,000 µm.

The one or more sources of biomass source may be reduced in size by standard techniques known in the art. The biomass may be reduced in size such that the biomass has an average particle diameter (D50) of from 30,000 µm to 60,000 µm such as an average particle diameter of from 40,000 µm to 50,000 µm.

In some embodiments, the one or more sources of biomass are provided as particles with a size in the above range by being introduced into a conventional chipping apparatus, although this will of course be dependent upon the specific source of biomass. For example, if the source of biomass occurs naturally with particles having sizes in the above range, then chipping will not be necessary. Accordingly, in some embodiments, the process of the invention may comprise chopping the one or more sources of biomass so as to have an average particle diameter (D50) of from 30,000 µm to 60,000 µm.

In some embodiments, the step of providing one or more sources of biomass with an average particle diameter (D50) of from 30,000 µm to 60,000 µm may comprise harvesting the one or more sources of biomass with a conventional combine. The combining process involves chopping and breaking up the one or more sources of biomass into particles of the desired size.

The step of providing one or more sources of biomass with an average particle diameter (D50) of from 30,000 µm to 60,000 μm may additionally comprise reducing the water content of the biomass to less than 50% by weight. Such a step may comprise compressing the one or more sources of biomass. This compression step typically squeezes moisture from the one or more sources of biomass such that the moisture content of the one or more source s of biomass is reduced to less than 50% by weight. Accordingly, in some embodiments, the step of providing biomass with a particle size as discussed above comprises compressing one or more sources of biomass with a moisture content of more than 70% by weight such that after compression, the moisture content of the one or more sources of biomass is less than 50% by weight.

In some embodiments, the step of providing biomass with a particle size as discussed above comprises both a step of compressing the biomass and also a step of chopping the biomass.

Figure 20:
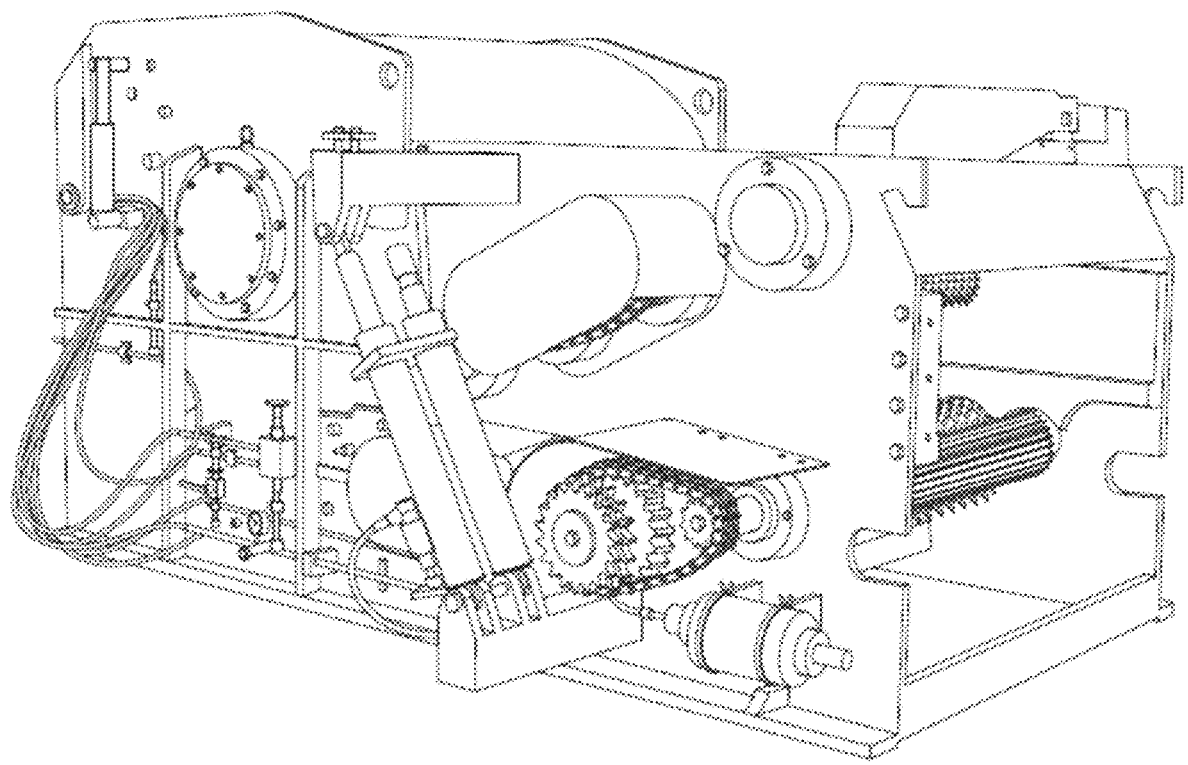
FIG. 20 is an illustration of an apparatus known in the art that can be used for chipping one or more sources of biomass.

The chopping step and compression step (if included) may be carried out using separate apparatus. Alternatively, the steps may be carried out in a single apparatus configured for both chipping and compressing the biomass. For example, a motorised rolling device suitable for compressing biomass may be placed on a conveyor belt that feeds a conventional chipping device. In this respect, the biomass source is compressed before it enters the chipper. Apparatus suitable for carrying out compression and chipping steps of the one or more sources of biomass are known in the art. An example of an apparatus used for chipping is shown in FIG. 20. Chipping apparatus such as those shown in FIG. 20 typically work on the principle of material entering the chipper via a conveying system such as conveyor belt that feeds material through a feeding port. The material is then cut into chips by a high-speed rotating blade (not shown) and a blade mounted on the base of the machine (not shown). The functioning of said mechanism and of similar chipping mechanisms are known to the person skilled in the art.

Figure 21:
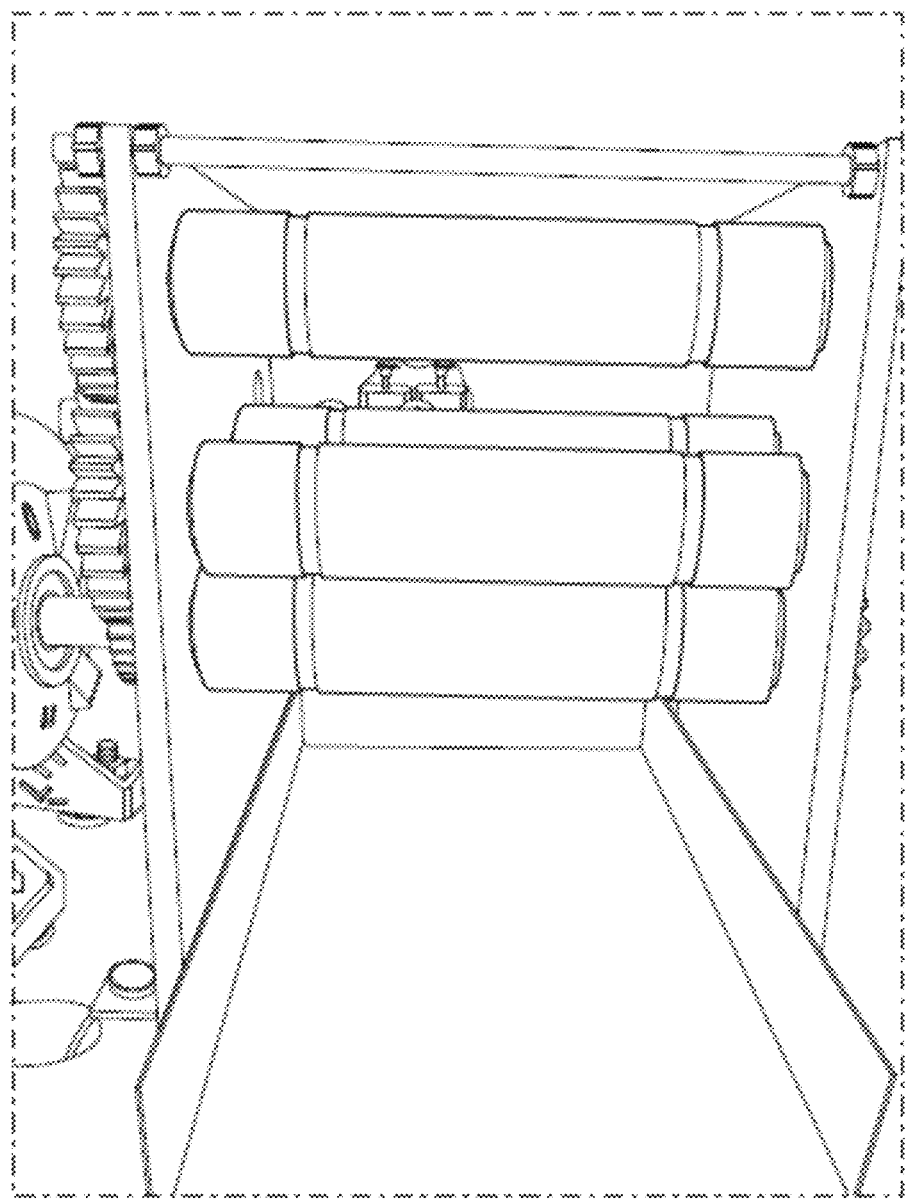
FIG. 21 is an illustration of an apparatus known in the art that can be used for compressing one or more sources of biomass.

An example of an apparatus used for the compression step is shown in FIG. 21.

As discussed above, in some embodiments, a rolling device such as that shown in FIG. 21 can be positioned on a conveyor belt to compress source material before said source material enters a chipping device, such as that shown in FIG. 20.

In other embodiments, the step of providing one or more sources of biomass does not comprise compressing the one or more sources of biomass, and/or does not comprise reducing the moisture content of the one or more sources of biomass.

Pulverisation of Biomass

Step (ii) comprises pulverising the one or more sources of biomass to provide a pulverised biomass powder with an average particle diameter (D50) of from 1000 μm to 10,000 μm.

The biomass source may be pulverised into a biomass powder by standard techniques known in the art. The biomass source may be pulverised such that the biomass powder has an average particle diameter (D50) of from 1000 μm to 10,000 μm. Preferably, the one or more sources of biomass are pulverised to have an average particle diameter of from 1000 μm to 8,000 μm, and more preferably from 1,000 to 5000 μm. As discussed above, pulverising the specific biomass sources for use in the present invention has been found to provide a biomass powder with an advantageous smaller particle size distribution than provided by grinding prior known biomass sources.

It has further been found that the smaller the particles of pulverised biomass powder, the greater the quality and performance characteristics of the biomass solid fuel product. Without being limited by theory, this is believed to be due to greater uniformity and homogeneity of the final solid biomass fuel product. Smaller powder particle size and greater uniformity and homogeneity of the final fuel product is believed to be linked to improved performance characteristics of the fuel upon combustion, and also to improved water proof characteristics of the solid fuel product.

Prior to pulverisation, the one or more sources of biomass with an average particle diameter (D50) of from 30,000 μm to 60,000 μm typically comprise less than 50% by weight of moisture.

Different pulverisation processes are preferred for different sources of biomass with different moisture contents. For example, when the moisture content of the one or more sources of biomass is 20% by weight or less, preferably, the step of pulverising the biomass involves the use of a negative pressure pneumatic conveyancing apparatus. Such negative pressure pneumatic conveyancing apparatus are known in the art.

When the moisture content of the one or more source of biomass is 20% by weight or greater, the one or more sources of biomass may be directly pulverised without the use of a negative pressure pneumatic conveyancing apparatus.

After the step of pulverising the one or more sources of biomass to provide a pulverised biomass powder with an average particle diameter (D50) of from 1000 μm to 10,000 μm, in some embodiments, the process of the invention may comprise a step of compressing the biomass powder prior to the drying step discussed in more detail below. For example, compression of the biomass after pulverisation may be desired if the biomass powder has a moisture content of greater than 30% by weight, although compression may also be carried out on biomass powder with lower moisture contents.

Figure 22:
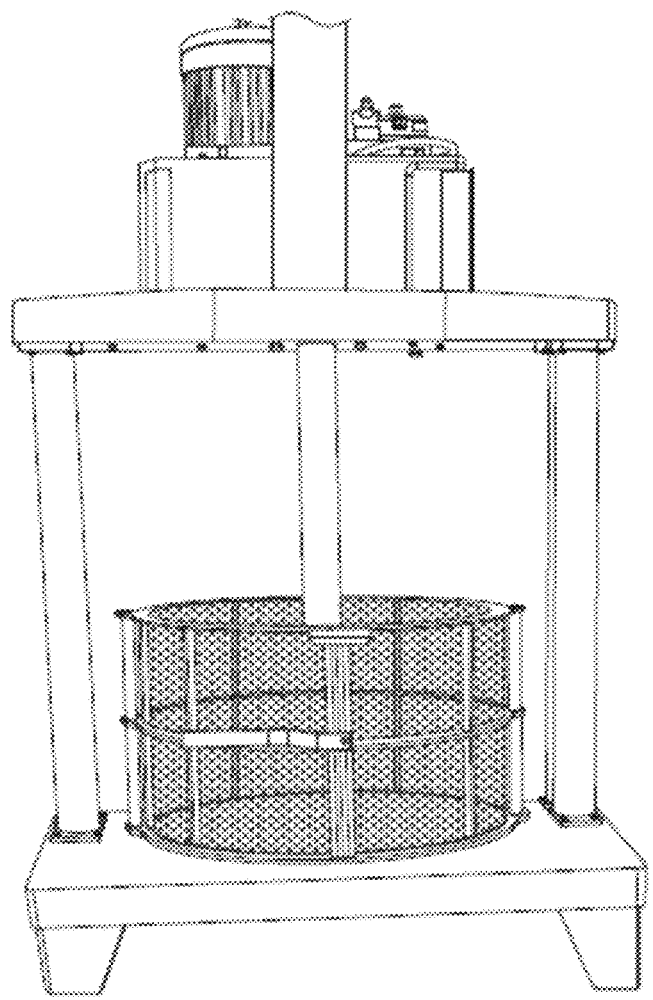
FIG. 22 is an illustration of an apparatus known in the art that can be used for compressing one or more sources of biomass.

The compression step may involve compressing the biomass powder using suitable apparatus known in the art. An example of such an apparatus is shown in FIG. 22. Such an apparatus operates by compressing the biomass powder with a hydraulic compression device. Material can be inserted into the meshed container shown in FIG. 22. The material may then be subjected to hydraulic compression with a hydraulic compression device causing water to exit the meshed container through the holes of the mesh.

Figure 23:
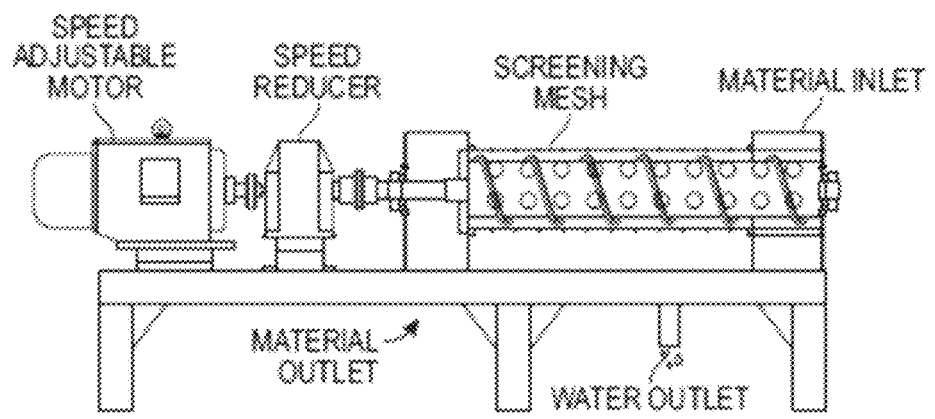
FIG. 23 is an illustration of an apparatus known in the art that can be used for compressing one or more sources of biomass.

Another apparatus that may be used to compress biomass powder is that shown in FIG. 23, which is a screw water squeezing machine. The material to be compressed is introduced into the spiral extrusion vessel. Moisture from the material is squeezed through the screen mesh by rotation of the motor-driven spiral screw.

It has been found that carrying out a compression step after the biomass has been pulverised as discussed above provides a compressed biomass powder with even lower water content. Typically, the moisture content of the compressed biomass powder is less than 30% by weight, such as less than 25% by weight or less than 20% by weight. The reduction in moisture of the biomass during the compression step may be desired so that the biomass has a lower moisture content at the start of the subsequent drying step. The drying step is thus sped up since less moisture needs to be removed from the biomass. However, as discussed above, it will be understood that it is not essential that the pulverised biomass powder is compressed prior to drying.

In other embodiments, the process of the invention does not comprise a step of compressing the pulverised biomass powder, and/or, does not comprise reducing the moisture content of the pulverised biomass powder.

Accordingly, in some embodiments, the process of the invention does not comprise any compression steps. Advantageously, it has been found that it is not necessary to carry out a compression step during formation of solid biomass fuel from the one or more sources of biomass, where the one or more sources of biomass are as defined above. This is in contrast to other sources of biomass that can be used to produce biomass solid fuel such as grasses, which typically require compression so as to reduce their moisture content when being processed into a solid biomass fuel.

Washing of the Pulverised Biomass Powder

Optionally, after the step of pulverising the one or more sources of biomass into pulverised biomass powder, the pulverised biomass powder may be washed. Any suitable washing liquid may be used. Examples of washing liquids include aqueous washing liquids such as water. The washing step has been found by the inventors to be advantageous in that it removes minerals such as potassium, sodium, chlorine, calcium and phosphorus containing salts from the biomass. Having less minerals in the biomass powder eases heating (torrefaction) process described below, and also makes it easier to combust the solid biomass fuel once formed. Examples of washing steps that may be used include the pre-washing step discussed in WO2013/162355.

Drying the Pulverised Biomass Powder

The biomass is dried in step (iii) of the process. Step (iii) of drying the pulverised biomass powder so as to provide a dried pulverised biomass powder typically comprises drying the pulverised biomass powder such that the dried pulverised biomass powder has a moisture content of from 10% by weight to 18% by weight, preferably from 12% by weight to 15% by weight. However, it will be appreciated that it is not essential that the dried pulverised biomass powder has a moisture content within this range.

The step of drying the biomass powder may also comprise mixing the pulverised biomass powder. If one source of biomass is used in the process, this single source of biomass may be mixed. Alternatively, if more than one source of biomass is used in the process, the drying step may involve mixing the pulverised biomass powder with one or more additional sources of biomass. For example, where the one or more sources of biomass comprise at least two sources of biomass, whilst the two or more sources of biomass can be mixed during any step of the process of the invention, preferably the one or more sources of biomass are mixed during the drying step of the process of the invention. In some embodiments, the pulverised biomass powder is mixed with an additional source of biomass that is also a pulverised biomass powder prepared using the process steps described herein. In other embodiments, the one or more additional sources of biomass are not processed as described herein. For example, the pulverised biomass powder prepared as described herein may be mixed with one or more additional sources of biomass that are prepared in different ways.

The pulverised biomass powder may be dried using any suitable method, such as using standard drying cylinders known in the art. For example, in some embodiments, the drying step is carried out in a drying apparatus that comprises a rotating drying drum. The rotation of the rotating drying drum can be used to mix the pulverised biomass powder with one or more additional sources of biomass as described above. Typically, the rotating drying drum comprises a lifting plate. The lifting plate continuously raises material while the drying cylinder rotates. It has surprisingly been found by the inventors of the present invention that the use of a rotating drying cylinder with a lifting plate results in improved mixing of the one or more biomass powders where the one or more biomass powders are being dried with additional materials, or where two or more biomass powders are being mixed.

In embodiments where the pulverised biomass powder has a moisture content of less than 20 wt %, typically, the pulverised biomass powder is dried in a single drying cylinder. Accordingly, in these embodiments, the process of the invention comprises drying the pulverised biomass powder in a only one single drying cylinder.

In embodiments where the pulverised biomass powder has a moisture content of greater than 20 wt %, the pulverised biomass powder is typically dried in multiple drying cylinders. Accordingly, in these embodiments, the process of the invention comprises drying the pulverised biomass powder in more than one drying cylinder. For example, the process may comprise drying the pulverised biomass powder in two or more, three or more, four or more, or five or more drying cylinders.

Molding the Dried Pulverised Biomass Powder

The dried pulverised biomass powder is molded so as to provide a molded biomass product. The molding step may be carried out in any molding apparatus known in the art and in accordance with biomass molding techniques known in the art, and may include extrusion systems. Preferably, the molding step is carried out in a compression mold. Preferably, the compression mold comprises a mold product exit hole. The molding step may be carried out using an apparatus as described in CN105435708.

Preferably, the molding step comprises molding the dried pulverised biomass powder into pellets. Accordingly, in a preferred embodiment, the molded biomass product and solid biomass fuel product comprises biomass pellets.

Whilst it is known to mold biomass powder to produce molded biomass products, the inventors of the present invention have surprisingly discovered that adapting the molding step such that the density of the molded biomass product produced from said step is controlled so as to be within a certain range imparts certain advantageous properties to the final solid biomass fuel product. Specifically, controlling the molding step such that the density of the molded biomass product is within the range of from 1.0 to 1.35 kg/L has been found to impart advantageous properties to the final biomass fuel product. Preferably, the molding step is controlled such that the density of the molded biomass product is from 1.0 kg/L to 1.35 kg/L. Typically, the above mentioned densities are determined according to NY/T 1881.7-2010. Accordingly, in some embodiments, the molding step is controlled such that the density of the molded biomass product is from 1.0 kg/L to 1.35 kg/L, wherein the density is determined according to NY/T 1881.7-2010.

The molding step may be controlled in a variety of ways. Where the molding process comprises the use of a compression mold, the density is typically controlled by using a compression ratio of less than 8, preferably less than 7, and more preferably less than 6. In highly preferable embodiments, a compression ratio of from 3.8 to 6.5 is used. Typically, the smaller the compression ratio, the lower the density of the molded biomass product. However, the higher the compression ratio, the lower the yield of the molded biomass product.

The compression ratio for a compression mold with a mold product exit hole may be defined as the ratio of the length to the diameter of the mold product exit hole.

Figure 24:
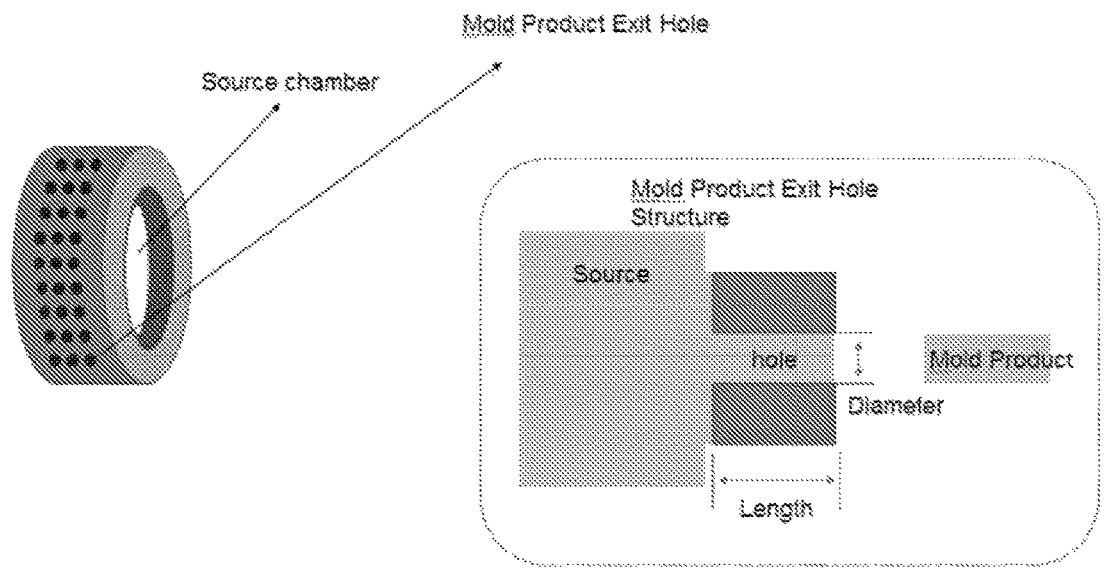
FIG. 24 is a diagram of a typical compression mold that may be used in accordance with the invention.

FIG. 24 shows an example of a compression mold that may be used in accordance with the present invention. The dried pulverised biomass powder is inserted into the interior of the mold before being squeezed from inside the mold by pressure such that it exits the mold product exit hole in the Figure. The compression ratio is shown in the Figure as the ratio of the length of the product out hole to its diameter.

In the process of the invention, preferably, the step (iv) of molding the dried pulverised biomass powder comprises adapting the molding step such that that density of the molded biomass product is controlled to be within the range of from 1.1 kg/L to 1.35 kg/L, typically wherein the density is determined according to NY/T 1881.7-2010. Preferably, the density is controlled by using a compression mold and controlling the compression ratio of the compression mold. More preferably, the compression ratio is from 3.8 to 6.5.

Controlling the density of the molded biomass product during the molding step has been found, surprisingly, to provide a final biomass fuel product with increased water proof capacity. Preferably, the solid biomass fuel product produced from a molded biomass product with a density within the range of from 1.1 kg/L to 1.35 kg/L is sufficiently water proof for up to 20 days, and preferably up to 30 days.

Preferably, an additive is added to the dried pulverised biomass powder prior to step (iv) of molding the dried pulverised biomass powder. Said additive is believed to improve the molding process and increase the yield of the molded biomass product produced from the molding step. Suitable additives are known in the art and include, but are not limited to starch, or starch derivatives.

Typically, other than additives such as those discussed above, no other fuel source is added so the dried pulverised biomass powder during the molding step. Accordingly, the molded biomass product of the molding step typically comprises only material derived from biomass as the fuel source in the solid biomass fuel. For example, when the dried pulverised biomass powder is molded into pellets, typically, no other fuel source is added to the dried pulverised biomass products prior to molding such that the solid biomass fuel pellets produced at the end of the process only contain a fuel source derived from biomass. In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass.

Where the term total fuel content of the solid fuel is used herein, this is intended to refer to the component of the solid fuel that is combustible material such as biomass derived material and coal. The term fuel content in relation to solid fuel is not intended to encompass additives that may be present in the solid fuel pellets that do not themselves combust to produce energy.

The molding step has also been found to enhance the waterproof properties of the final biomass solid fuel product. The increase in density that occurs during the molding step means that it is harder for water to penetrate the denser molded biomass product particles.

Furthermore, with a denser product, more biomass is concentrated in the interior of the molded product, and so is not in direct contact with water.

Heating the Molded Biomass Product

The molded biomass product is heated so as to produce a solid biomass fuel. The heating is carried out at a temperature of from 160° C. to 420° C. for a time period of from 0.25 to 5 hours. Preferably, the step of heating the molded biomass product is carried out for a time period of from 0.4 to 2 hours. Preferably, the step of heating the molded biomass product comprises heating the molded biomass product to a temperature of from 180° C. to 350° C., and more preferably to a temperature of from 210° C. to 280° C.

Preferably, the step (v) of heating the molded biomass product comprises heating the molded biomass product under conditions so as to induce torrefaction of the molded biomass product. Torrefaction is a process of mild pyrolysis in which the heating is carried out in a low oxygen atmosphere such as an atmosphere of less than 10% oxygen content. Suitable conditions and processes of torrefaction are known in the art. Accordingly, preferably step (v) of heating the molded biomass product comprises torrefaction.

The heating step may be carried out in any suitable apparatus known in the art for heating the molded biomass product. For example, the heating step may be carried out in apparatus and using process conditions as disclosed in EP3287509A1.

Preferably, step (v) of heating the molded biomass product is adapted so as to control the uniformity of the solid biomass fuel, optionally wherein adapting step (v) so as to control the uniformity of the solid biomass fuel comprises conducting step (v) in an apparatus in which the molded biomass product is rotated whilst being heated, optionally, wherein adapting step (v) so as to control the uniformity of the solid biomass fuel comprises controlling the speed or direction of rotation of the molded biomass product, optionally wherein the molded biomass product is rotated in the apparatus in both an anticlockwise and clockwise direction. The uniformity of the solid biomass fuel is also optimised by the heating temperatures and time periods discussed above.

In some embodiments, the process of the invention may comprise a step of cooling the solid biomass fuel after heating. Where the process of the invention comprises a cooling step after the step of heating the biomass, the cooling step may comprise rotating the solid biomass fuel. The biomass may be rotated in a suitable apparatus such as those disclosed in EP3287509A1. Preferably, both heating step (v) and the step of cooling the biomass comprise rotating the biomass. Where the biomass is rotated in either the cooling step or the heating step, the biomass may be rotated in different directions, such as both clockwise and anticlockwise in successive cycles.

The term 'uniformity' of the solid biomass product is used to refer to the solid biomass fuel or molded biomass product having constant or similar properties across each particle of solid biomass fuel or molded biomass product and across the plurality of particle s within a bulk sample of the solid biomass fuel product or molded biomass product. For example, but not limited to, the densities of the particles, the ease of combustion of the particles, the chemical composition of the particles, and the water resistant properties of the particles. Uniformity is a highly desirable property for biomass fuels for use in combustion processes.

It has also been found by the inventors that controlling the heating step in the manner discussed above additionally aids in providing a solid biomass fuel product with enhanced water proof properties compared to the biomass fuels of the prior art. During the heating step, hydrophilic compounds present in the biomass powders that absorb water are degraded. Furthermore, the heating step causes oils present in the biomass powders to migrate to the exterior of the biomass powder particles, increasing the hydrophobicity of said particles.

Removing Dust Particles from the Solid Biomass Fuel

The process of the invention involves a step of removing dust particles from the solid biomass fuel. It has been found by the inventors of the present invention that in biomass solid fuel production processes known in the art, significant quantities of dust adheres to the solid biomass fuel. This dust is problematic because it may pollute the air during transport and packaging of the solid biomass fuel. The dust may also pollute the local environment. Furthermore, when stored in the open air, dust particles form mildew and affect the performance and quality of the solid biomass fuel. Thus, it would be beneficial for dust on the surfaces of the particles of the solid biomass fuel to be removed.

The inventors have found that the dust on the surface of the biomass solid fuel particles may be removed by inducing friction between the particles. For example, dust that is adhered to the particles may be removed by inducing friction by means such as vibrating or rotating the solid biomass fuel particles. Accordingly, the step (vi) of removing dust from the solid biomass particles may comprise inducing friction between the particles of solid biomass fuel.

Figure 25:
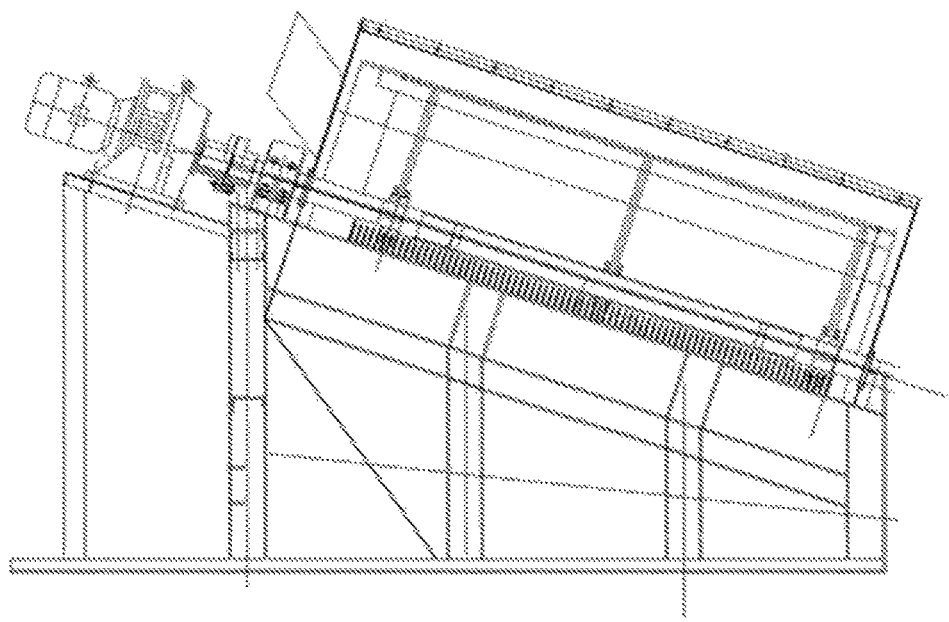
FIGS. 25 and 26 show apparatus that may be used in vibrating, rolling or rotating a biomass solid fuel product of the invention.
Figure 26:
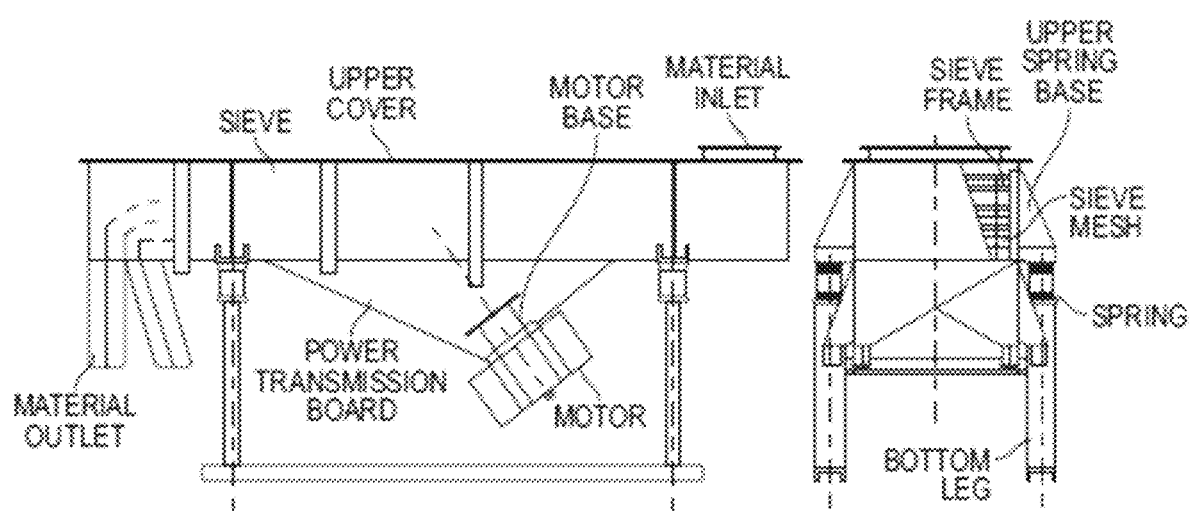

For example, step (vi) of removing dust from the solid biomass particles may comprise subjecting the particles to vibration, rotation, rolling, or any combination thereof. Suitable apparatus for conducting rolling, rotation, and vibration of the solid biomass fuel particles are known to the person skilled in the art, and are shown in FIGS. 25 and 26. An example of an apparatus that may be used to remove dust from the particles is a rotating drum sieve.

Step (vi) of removing dust particles from the solid biomass fuel may comprise removing dust particles from the solid biomass fuel with a screen. Typically, the screen has a pore size of from 2 mm to 10 mm, preferably 2 mm to 8 mm, more preferably from 2 mm to 5 mm, and most preferably from 2 mm to 3 mm. Dust particles that are admixed with the solid biomass fuel particles may be separated from the solid biomass fuel by passing through the screen. The larger solid biomass fuel particles do not pass through the screen and are thus separated from the dust particles. Suitable apparatus and methods for performing the screening step are known to those skilled in the art, and any of said suitable apparatus may be used. For example, an apparatus that employs screening, rolling and rotating the solid biomass fuel may be used to remove dust particles from the solid biomass fuel. In the use of such a device, solid biomass fuel may be laid upon a screen, and the screen may be driven to roll and rotate upon its axis by operation of a motor. During rolling/tilting and rotation of the screen, material on the sieve surface of the screen is turned over. Some material passes through the screen and is separated from material that does not pass through the screen. The rolling and rotation of the screen causes material stuck in the pores of the screen to fall through and thus clogging of the pores of the screen is prevented. Alternatively, an apparatus that vibrates and screens the solid biomass fuel particles may be used. In this case, a motor can be used to vibrate the screen which may cause material to be thrown up on the screen surface. This process may cause small particles adhered to larger ones to come loose and then pass through the pores in the screen. An example of an apparatus that employs a screen and vibration to separate larger particles from smaller particles, where the smaller particles may or may not be adhered to the larger particles is a device as taught in CN201324717.

Accordingly, methods of the invention may comprise subjecting the solid biomass fuel particles to one or more of rolling, rotation and vibration so as to induce friction between the solid biomass fuel particles which causes dust particles adhered to said solid biomass fuel particles to be removed from said particles. The methods then preferably comprise subjecting the mixture of solid biomass fuel particles and dust particles to a screening step as discussed above to remove said dust particles from said solid biomass fuel particles. Accordingly, removal step (vi) is an effective post-treatment for removing dust from said particles of solid biomass fuel.

Pre-Treatment and Post-Treatment

Steps (iv) and (v) discussed above of molding and heating so as to form a solid biomass fuel can typically be considered to be the principal production steps of converting the one or more sources of biomass into a solid biomass fuel.

In contrast, steps (i) to (iii) of providing, pulverising and drying the biomass can be considered to be a method of pre-treating one or more sources of biomass prior to the conversion of said one or more sources of biomass (in a processed form as the dried pulverised biomass powder) into the solid biomass fuel via molding and heating steps. Accordingly, the invention provides a pre-treatment process as discussed above. The pre-treatment process comprises steps (i) to (iii) of providing, pulverising and drying the biomass. These steps can be the same as steps (i) to (iii) discussed above in the context of the process according to the invention of producing a solid biomass fuel.

The pre-treatment process of the invention is preferably carried out before steps (iv) to (vi) discussed above of the process of making a solid biomass fuel. However, this is not essential, and the pre-treatment process of the invention may be carried out prior to any process for converting one or more sources of biomass into a solid biomass fuel. Preferably, the pre-treatment process is carried out before a process for producing a solid biomass fuel that comprises a step of molding, heating, or both molding and heating.

The term "pre-treatment" as used herein refers to a process carried out to condition a starting material in a process for converting one or more sources of biomass into a solid biomass fuel. Preferably, the term "pre-treatment" refers to treating a biomass source starting material prior to a process of converting said biomass source into a solid biomass fuel, where said process involves a molding or heating step.

Step (vi) discussed above of removing dust particles from the solid biomass fuel may be considered to be a post-treatment step of the solid biomass fuel. Accordingly, the invention provides a post-treatment process as discussed above.

The post-treatment process of the invention is preferably carried out after steps (iv) to (v), or steps (i) to (v) discussed above of the process of making a solid biomass fuel. However, this is not essential, and the post-treatment process of the invention may be carried out after any process for converting one or more sources of biomass into a solid biomass fuel. Preferably, the post-treatment process is carried out after a process for producing a solid biomass fuel that comprises a step of molding, heating, or both molding and heating.

The term "post-treatment" as used herein refers to a process carried out on a solid biomass fuel after said solid biomass fuel has been produced from one or more sources of biomass. Preferably, the term "post-treatment" refers to treating a solid biomass fuel starting material after a process of converting a biomass source into said solid biomass fuel, where said process involves a molding or heating step.

The Solid Biomass Fuel Product

The solid biomass fuel product may have any of the physical properties discussed above.

As discussed above, the biomass solid fuel of the invention preferably comprises pellets. The pellets may be any suitable size. Preferably, the pellets have a diameter of from 3 mm to 100 mm, and more preferably, 5 mm to 8 mm. Preferably, the pellets have a length of from 20 mm to 60 mm, and more preferably from 30 mm to 50 mm. As discussed above, surprisingly, it has been found that the solid biomass fuel product of the invention has enhanced waterproof characteristics compared to solid biomass fuel products made by prior art processes. This is believed to be due to controlling the pulverising, molding and/or heating step as discussed above. Biomass fuels of the prior art have been found by the inventors to be sufficiently water proof for only up to 10 days. In contrast, it has been found the solid biomass fuel products of the invention are sufficiently waterproof up to 20 days, preferably 30 days and more preferably 40 days.

The water proof properties of the solid biomass fuels may be determined according to standard tests of the Energy Research Centre of the Netherlands (ECN).

The moisture content of the biomass solid fuel of the invention may also be determined by standard ECN test methods. The internal moisture content of the solid biomass fuel of the invention is typically less than 8 wt %, preferably less than 6 wt %, and more preferably less than 5 wt %, wherein the internal moisture content is determined according to DIN EN 14774.

The biomass solid fuel has a base moisture content of typically less than 10 wt %, preferably less than 8 wt %, and most preferably less than 6 wt %, wherein the base moisture content is determined according to GB/T211-2017.

The solid biomass fuel of the invention has also been found to have unexpectedly high mechanical durability. The mechanical durability is typically higher than 90%, and preferably higher than 95%. This is advantageous since biomass pellets of 95% mechanical durability or greater have been found to be able to stored outside without damage to for periods as long as two months. In contrast, biomass pellets with less than 90% mechanical durability typically are damaged by rainfall and are not able to be stored outside. Accordingly, high mechanical durability is an additional advantage of biomass pellets of the invention.

An additional advantage associated with high durability of the solid biomass fuel particles is that if the pellets are somehow broken by force, they fall apart in larger pieces than pellets with low mechanical durability. This minimises any dust explosion risks.

As discussed above, in preferable embodiments, typically, other than additives such as those discussed above, no other fuel source is added to the heated biomass product during the molding step. Accordingly, the solid biomass fuel typically comprises only material derived from biomass as the fuel source in the solid biomass fuel. For example, when the heated biomass product is molded into pellets, typically, no other fuel source is added to the heated biomass products prior to molding such that the solid biomass fuel pellets produced by the molding step only contain a fuel source derived from biomass.

In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass.

Combustion Processes

The product of the present invention may be used in a variety of different combustion processes. The suitability of said products for use in a particular process will be apparent to those of skill in the art. For example, the biomass fuel of the invention may be used in a combustion process in a power plant or industrial process on its own. Alternatively, the biomass product of the invention may be used in a combustion process along with an additional fuel such as coal in a co-firing process.

Advantageously, products of the invention have been found to provide very low PM1.0 emissions when compared to other biomass fuels known in the art. Additionally, the PM1.0 emissions of the process are lower than processes that involve the combustion of coal.

Advantageously, the improved physical properties of biomass fuels of the invention have been found to render the biomass particularly suitable for co-firing with coal. For example, the improved quality and uniformity of the product enable the biomass fuel of the invention to be co-fired with coal particularly well. The improved water proof properties of the biomass fuel of the invention also mean that the biomass is particularly suited to being co-fired with coal as well as being made easier to store and transport due to its water proof nature.

Example 1

A process according to the present invention was carried out. The source of biomass was bagasse only. The temperature of the heating step was from 220° C. to 280° C. for a time period of from 0.4 to 2 hours. After the heating step, the solid biomass fuel product was cooled. The solid biomass fuel had a bulk density of from 0.60 to 0.65 kg/L as determined according to DIN EN 15103.

Example 2

A process according to the present invention was carried out. The source of biomass was sunflower stalks only. The temperature of the heating step was from 220° C. to 280° C. for a time period of from 0.4 to 2 hours. After the heating step, the solid biomass fuel product was cooled. The solid biomass fuel had a bulk density of from 0.60 to 0.65 kg/L as determined according to DIN EN 15103.

Example 3

A process according to the present invention was carried out. The source of biomass was wheat stalk only. The temperature of the heating step was from 220° C. to 280° C. for a time period of from 0.4 to 2 hours. After the heating step, the solid biomass fuel product was cooled. The solid biomass fuel had a bulk density of from 0.58 to 0.65 kg/L as determined according to DIN EN 15103.

Example 4

A process according to the present invention was carried out. The source of biomass was corn stalks only. The temperature of the heating step was from 220° C. to 280° C. for a time period of from 0.4 to 2 hours. After the heating step, the solid biomass fuel product was cooled. The solid biomass fuel had a bulk density of from 0.61 to 0.66 kg/L as determined according to DIN EN 15103.

Example 5

A process according to the present invention was carried out. The source of biomass was sorghum stalks only. The temperature of the heating step was from 220° C. to 280° C. for a time period of from 0.4 to 2 hours. After the heating step, the solid biomass fuel product was cooled. The solid biomass fuel had a bulk density of from 0.62 to 0.66 kg/L as determined according to DIN EN 15103.

Example 6

A process according to the present invention was carried out. The source of biomass was soybean stalk only. The temperature of the heating step was from 220° C. to 280° C. for a time period of from 0.4 to 2 hours. After the heating step, the solid biomass fuel product was cooled. The solid biomass fuel had a bulk density of from 0.61 to 0.66 kg/L as determined according to DIN EN 15103.

Example 7

A process according to the present invention was carried out. The source of biomass was peanut stalk only. The temperature of the heating step was from 220° C. to 280° C. for a time period of from 0.4 to 2 hours. After the heating step, the solid biomass fuel product was cooled. The solid biomass fuel had a bulk density of from 0.62 to 0.68 kg/L as determined according to DIN EN 15103.

Example 8

A process according to the present invention was carried out. The source of biomass was cotton stalk only. The temperature of the heating step was from 220° C. to 280° C. for a time period of from 0.4 to 2 hours. After the heating step, the solid biomass fuel product was cooled. The solid biomass fuel had a bulk density of from 0.62 to 0.68 kg/L as determined according to DIN EN 15103.

Example 9

A process according to the present invention was carried out. The source of biomass was rape stalk only. The temperature of the heating step was from 220° C. to 280° C. for a time period of from 0.4 to 2 hours. After the heating step, the solid biomass fuel product was cooled. The solid biomass fuel had a bulk density of from 0.58 to 0.65 kg/L as determined according to DIN EN 15103.

Example 10

A process according to the present invention was carried out. The source of biomass was coconut husk only. The temperature of the heating step was from 220° C. to 280° C. for a time period of from 0.4 to 2 hours. After the heating step, the solid biomass fuel product was cooled. The solid biomass fuel had a bulk density of from 0.62 to 0.72 kg/L as determined according to DIN EN 15103.

Example 11

A process according to the present invention was carried out. The source of biomass was palm husk only. The temperature of the heating step was from 220° C. to 280° C. for a time period of from 0.4 to 2 hours. After the heating step, the solid biomass fuel product was cooled. The solid biomass fuel had a bulk density of from 0.62 to 0.70 kg/L as determined according to DIN EN 15103.

Example 12

A process according to the present invention was carried out. The source of biomass was seaweed only. The temperature of the heating step was from 220° C. to 280° C. for a time period of from 0.4 to 2 hours. After the heating step, the solid biomass fuel product was cooled. The solid biomass fuel had a bulk density of from 0.61 to 0.66 kg/L as determined according to DIN EN 15103.

Example 13

A process according to the present invention was carried out. The source of biomass was peanut hull only. The temperature of the heating step was from 220° C. to 280° C. for a time period of from 0.4 to 2 hours. After the heating step, the solid biomass fuel product was cooled. The solid biomass fuel had a bulk density of from 0.61 to 0.66 kg/L as determined according to DIN EN 15103.

Characterisation of the solid biomass fuel products produced in Examples 1 to 13 is shown in FIGS. 1 to 18. In these Figures, A corresponds to the product of Example 1, B corresponds to the product of Example 2, C corresponds to the product of Example 3, D corresponds to the product of Example 4, E corresponds to the product of Example 5, F corresponds to the product of example 6, G corresponds to the product of Example 7, H corresponds to the product of Example 8, I corresponds to the product of Example 9, J corresponds to the product of Example 10, K corresponds to the product of Example 11, L corresponds to the product of Example 12, and M corresponds to the product of Example 13.

Figure 19:
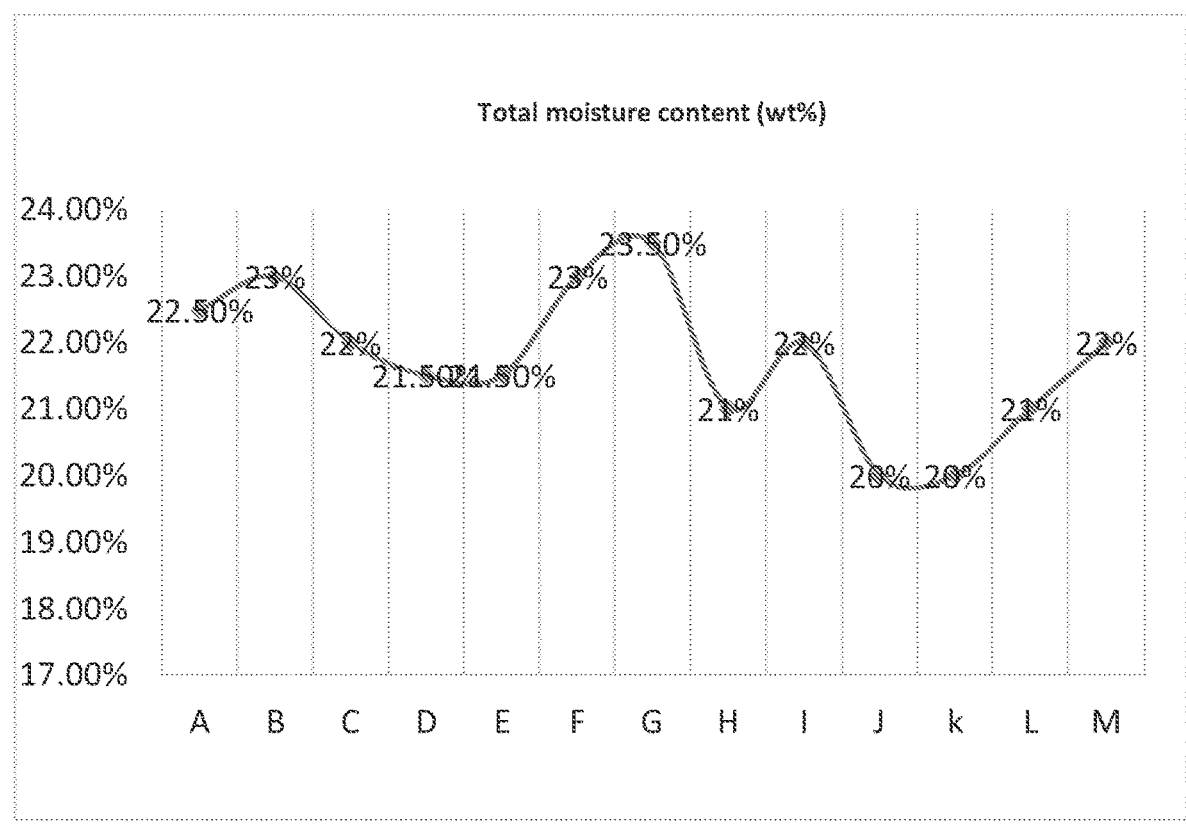
FIG. 19 shows the total moisture content of various biomass fuels of the invention, as determined by GB/T211-2017, after soaking in water for 20 days.

FIG. 19 shows the total moisture content of the biomass fuels of the examples after soaking in water for 20 days.

The invention claimed is:

1. A process for producing a solid biomass fuel, wherein the process comprises the following steps:
   (i) providing one or more sources of biomass with an average particle diameter (D50) of from 30,000 µm to 60,000 µm;
   (ii) pulverizing the one or more sources of biomass to provide a pulverized biomass powder with an average particle diameter (D50) of from 1000 µm to 10,000 µm;
   (iii) drying the pulverized biomass powder so as to provide a dried pulverized biomass powder;
   (iv) molding the dried pulverized biomass powder with a compression mold so as to provide a molded biomass product with a bulk density of from 1.1 kg/L to 1.35 kg/L; wherein the density of the molded biomass product is controlled by using a compression ratio of the compression mold of from 3.8 to 6.5;
   (v) heating the molded biomass product to a temperature of from 160° C. to 420° C. for a time period of from 0.25 to 5 hours so as to provide a solid biomass fuel; and
   (vi) removing dust particles from the solid biomass fuel; wherein the one or more sources of biomass comprise bagasse, sunflower stalks, wheat stalks, corn stalks, sorghum stalks, soybean stalk, peanut stalks, cotton stalks, rape stalks, coconut husks, palm husks, seaweed, peanut hulls, or a combination thereof.

2. The process according to claim 1, wherein the one or more sources of biomass consist essentially of: bagasse, sunflower stalks, wheat stalks, corn stalks, sorghum stalks, soybean stalks, peanut stalks, cotton stalks, rape stalks, coconut husks, palm husks, seaweed, peanut hulls, or a combination thereof.

3. The process according to claim 1, wherein step (i) of providing one or more sources of biomass with an average particle diameter (D50) of from 30,000 µm to 60,000 µm comprises chopping the one or more sources of biomass so as to have an average particle diameter (D50) of from 30,000 µm to 60,000 µm; and/or wherein step (ii) of pulverizing the one or more sources of biomass to provide a pulverized biomass powder with an average particle diameter (D50) of from 1000 µm to 10,000 µm comprises (a) crushing the one or more sources of biomass in a process involving the use of a negative pressure pneumatic conveyancing apparatus where the moisture content of the one or more sources of biomass is 20% by weight or less.

4. The process according to claim 1, wherein step (iii) of drying the pulverized biomass powder so as to provide a dried pulverized biomass powder comprises drying the pulverized biomass in a drying cylinder, wherein (i) the moisture content of the pulverized biomass powder is 20% by weight or less, and wherein the process comprises drying the pulverized biomass in a single drying cylinder; or (ii) wherein the moisture content of the pulverized biomass powder is 20% by weight or more, and wherein the process comprises drying the pulverized biomass in multiple drying cylinders.

5. The process according to claim 1, wherein step (iv) of molding the dried pulverized biomass powder comprises adapting the molding step such that the density of the molded biomass product is controlled, wherein adapting the molding step such that the density of the molded biomass product is controlled comprises controlling the compression ratio of a mold used in said molding step.

6. The process according to claim 1, wherein step (v) of heating the molded biomass product is carried out for a time period of from 0.4 to 2.5 hours, and/or wherein the step of heating the molded biomass product comprises heating the molded biomass product to a temperature of from 180° C. to 350° C.

7. The process according to claim 1, wherein step (v) of heating the molded biomass product is adapted so as to control the uniformity of the solid biomass fuel, by conducting step (v) in an apparatus in which the molded biomass product is rotated whilst being heated, and controlling the speed or direction of rotation of the molded biomass product, such as wherein the molded biomass product is rotated in the apparatus in both an anticlockwise and clockwise direction.

8. The process according to claim 1, wherein step (vi) of removing dust particles from the solid biomass fuel comprises removing dust particles from the solid biomass fuel with a screen; wherein the screen has a pore size of from 2 mm to 8 mm.

9. The process according to claim 1, wherein step (vi) of removing dust particles from the solid biomass fuel comprises subjecting the solid biomass fuel to vibration, rotation, rolling, or any combination thereof.

10. The process according to claim 1, wherein the bulk density of the solid biomass fuel as determined according to DIN EN 15103 is from 0.55 kg/l to 0.8 kg/l; and/or wherein the mechanical durability of the solid biomass fuel as determined according to DIN EN 15210-1 is 90% or more.

11. The process according to claim 1, wherein the one or more sources of biomass are selected from the group consisting of:
(i) bagasse, and wherein the solid biomass fuel has a bulk density of from 0.60 kg/L to 0.65 kg/L, and wherein the mechanical durability of the solid biomass fuel is 95% or higher;
(ii) sunflower stalks, and wherein the solid biomass fuel has a bulk density of from 0.60 kg/L to 0.65 kg/L, and wherein the mechanical durability of the solid biomass fuel is 95% or higher;
(iii) wheat stalks, and wherein the solid biomass fuel has a bulk density of from 0.58 kg/L to 0.65 kg/L, and wherein the mechanical durability of the solid biomass fuel is 95% or higher;
(iv) corn stalks, and wherein the solid biomass fuel has a bulk density of from 0.61 kg/L to 0.66 kg/L, and wherein the mechanical durability of the solid biomass fuel is 96% or higher;
(v) sorghum stalk, and wherein the solid biomass fuel has a bulk density of from 0.62 kg/L to 0.66 kg/L, and wherein the mechanical durability of the solid biomass fuel is 97% or higher;
(vi) soybean stalks, and wherein the solid biomass fuel has a bulk density of from 0.61 kg/L to 0.66 kg/L, and wherein the mechanical durability of the solid biomass fuel is 96% or higher;
(vii) peanut stalks, and wherein the solid biomass fuel has a bulk density of from 0.62 kg/L to 0.68 kg/L, and wherein the mechanical durability of the solid biomass fuel is 97% or higher;
(viii) cotton stalk, and wherein the solid biomass fuel has a bulk density of from 0.62 kg/L to 0.68 kg/L, and wherein the mechanical durability of the solid biomass fuel is 98% or higher;
(ix) rape stalk, and wherein the solid biomass fuel has a bulk density of from 0.58 kg/L to 0.65 kg/L, and wherein the mechanical durability of the solid biomass fuel is 98% or higher;
(x) coconut shell, and wherein the solid biomass fuel has a bulk density of from 0.62 kg/L to 0.72 kg/L, and wherein the mechanical durability of the solid biomass fuel is 98% or higher;
(xi) palm husks, and wherein the solid biomass fuel has a bulk density of from 0.62 kg/L to 0.70 kg/L, and wherein the mechanical durability of the solid biomass fuel is 98% or higher;
(xii) seaweed, and wherein the solid biomass fuel has a bulk density of from 0.61 kg/L to 0.66 kg/L, and wherein the mechanical durability of the solid biomass fuel is 96% or higher; or
(xiii) peanut hulls, and wherein the solid biomass fuel has a bulk density of from 0.61 kg/L to 0.66 kg/L, and wherein the mechanical durability of the solid biomass fuel is 97% or higher;
wherein the bulk density is determined according to DIN EN 15103, and wherein the mechanical durability is determined according to DIN EN 15210-1.

12. The process according to claim 1, wherein the biomass solid fuel has at least one property selected from the group consisting of (i) total dry sulfur content of the biomass solid fuel is 0.5 wt % or less, wherein the total dry sulfur content is determined according to DIN EN 15289; (ii) total dry hydrogen content of the biomass solid fuel is 3 wt % or more, wherein the total dry hydrogen content is determined according to DIN EN 15104; (iii) total dry oxygen content of the biomass solid fuel is 20 wt % or more, wherein the total dry oxygen content is determined according to DIN EN 15296; (iv) total dry carbon content of the biomass solid fuel is 40 wt % or more, wherein total dry carbon content is determined according to DIN EN 15104; (v) total dry nitrogen content of the biomass solid fuel is less than 5.0 wt %, wherein the total dry nitrogen content is determined according to DIN EN 15104; (vi) chemical oxygen demand (COD) of the solid biomass fuel when immersed in water is 5000 ppm or less, wherein the chemical oxygen demand is determined according to GB/11914-89; (vii) fixed carbon content of the solid biomass fuel is 20 wt % or more, wherein the fixed carbon content is determined according to DIN EN 51734; (viii) ash content of the solid biomass fuel is less than 20 wt %, wherein the ash content is determined according to EN 14775 at 550° C.; (ix) volatile matter content of the solid biomass fuel is from 35 wt % to 80 wt %, wherein the volatile matter content is determined according to DIN EN 15148; and (x) internal moisture content of the solid biomass fuel is less than 8 wt %, wherein the internal moisture content is determined according to DIN EN 14774.

13. The process according to claim 1, wherein the biomass solid fuel has a calorific value of from 4300 kcal/kg to 6500 kcal/kg, wherein the calorific value is determined in accordance with DIN EN 14918; and/or wherein the biomass solid fuel has a base moisture content of less than 10 wt %, wherein the base moisture content is determined according to GB/T211-2017.

14. The process according to claim 1, wherein the biomass solid fuel has a property selected from the group consisting of (i) the pH of the solid biomass fuel is from 4 to 10; (ii) coke residue of the solid biomass fuel upon combustion is 1 to 4; or (iii) the solid biomass fuel is waterproof for up to at least 20 days.

15. The process according to claim 1, wherein bulk density of the molded biomass product is A, and the bulk density of the biomass solid fuel is B, and wherein B/A is 0.55 to 1, wherein the bulk density is determined in accordance with DIN EN 15103; and/or wherein material derived from biomass is present in the solid biomass fuel in an amount of at least 95% by weight of the total fuel content of the solid biomass fuel.

16. The process according to claim 1, further comprising the step of combusting the solid biomass fuel so as to produce energy.

17. The process according to claim 16, wherein (i) the solid biomass fuel is co-fired and combusted alongside a fossil fuel; and/or (ii) wherein the PM1.0 emissions of the combustion process are less than 175 mg/kg.

* * * * *